United States Patent
Wang et al.

(10) Patent No.: US 11,570,747 B2
(45) Date of Patent: Jan. 31, 2023

(54) USER EQUIPMENT SELECTION FOR SIDELINK-ASSISTED POSITION ESTIMATION PROCEDURE

(71) Applicant: QUALCOMM Incorporated, San Diego, CA (US)

(72) Inventors: Xiaojie Wang, Hillsborough, NJ (US); Piyush Gupta, Bridgewater, NJ (US); Junyi Li, Fairless Hills, PA (US); Xiaoxia Zhang, San Diego, CA (US); Srinivas Yerramalli, Hyderabad (IN); Rajat Prakash, San Diego, CA (US); Marwen Zorgui, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/362,164

(22) Filed: Jun. 29, 2021

(65) Prior Publication Data

US 2022/0417897 A1    Dec. 29, 2022

(51) Int. Cl.
*H04W 64/00*    (2009.01)
*H04W 72/04*    (2009.01)
(Continued)

(52) U.S. Cl.
CPC ......... *H04W 64/006* (2013.01); *H04W 4/021* (2013.01); *H04W 72/0406* (2013.01); *H04W 92/18* (2013.01)

(58) Field of Classification Search
CPC ....... H04W 4/40; H04W 92/18; H04W 76/14; H04W 72/042; H04W 64/00;
(Continued)

(56) References Cited

U.S. PATENT DOCUMENTS

2016/0095080 A1* 3/2016 Khoryaev ............. G01S 5/0284
455/456.1

FOREIGN PATENT DOCUMENTS

WO    WO-2021003475 A1    1/2021
WO    WO-2021058478 A1    4/2021

OTHER PUBLICATIONS

Fraunhofer HHI., et al., "Remaining Issues in Physical Layer Procedures for NR V2X", 3GPP Draft, 3GPP TSG RAN WG1 #100-e, R1-2000562, 3rd Generation Partnership Project (3GPP), Mobile Competence Centre, 650, Route Des Lucioles, F-06921 Sophia-Antipolis Cedex, France, vol. RAN WG1, No. e-Meeting, Feb. 24, 2020-Mar. 6, 2020, Feb. 14, 2020 (Feb. 14, 2020), XP051852923, 6 Pages, Retrieved from the Internet: URL: https://ftp.3gpp.org/tsg_ran/WG1_RL1/TSGR1_100_e/Docs/R1-2000562.zip R1-2000562_PhyLayerProc.docx [Retrieved on Feb. 14, 2020] Sections 2.1, 3.

(Continued)

*Primary Examiner* — Kwasi Karikari
(74) *Attorney, Agent, or Firm* — Thien T. Nguyen

(57) ABSTRACT

Disclosed are techniques for wireless communication. In an aspect, a target UE receives zone information associated with a set of zones, the zone information indicating, for each of a plurality of candidate UEs for a sidelink-assisted position estimation procedure of the target UE, a zone identifier of a zone in which the respective candidate UE is located. The target UE selects one or more candidate UEs for the sidelink-assisted position estimation procedure based at least in part upon the zone information. The target UE performs the sidelink-assisted position estimation procedure with at least the selected one or more candidate UEs.

28 Claims, 19 Drawing Sheets

(51) Int. Cl.
*H04W 4/021* (2018.01)
*H04W 92/18* (2009.01)

(58) Field of Classification Search
CPC ... H04W 24/10; H04W 72/0406; H04W 4/46; H04W 4/023; H04W 56/001; H04W 64/003; H04W 36/32; H04W 8/24
See application file for complete search history.

(56) References Cited

OTHER PUBLICATIONS

Huawei, et al., "Rel-17 Work Scope on NR Sidelink Enhancements for 5G V2X and Other Use Case", 3GPP TSG RAN Meeting #84, RP-191011 Rel-17 Work Scope on NR Sidelink Enhancements for V2X and Other Use Case_Near Final, 3rd Generation Partnership Project, Mobile Competence Centre, 650, Route Des Luciole, vol. TSG RAN, No. Newport Beach, USA, Jun. 3, 2019-Jun. 6, 2019 Jun. 2, 2019, XP051747224, 12 Pages.
International Search Report and Written Opinion—PCT/US2022/072056—ISA/EPO—dated Aug. 8, 2022.

* cited by examiner

USER EQUIPMENT SELECTION FOR SIDELINK-ASSISTED POSITION ESTIMATION PROCEDURE

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Leveraging the increased data rates and decreased latency of 5G, among other things, vehicle-to-everything (V2X) communication technologies are being implemented to support autonomous driving applications, such as wireless communications between vehicles, between vehicles and the roadside infrastructure, between vehicles and pedestrians, etc.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of operating a target user equipment (UE) includes receiving zone information associated with a set of zones, the zone information indicating, for each of a plurality of candidate UEs for a sidelink-assisted position estimation procedure of the target UE, a zone identifier of a zone in which the respective candidate UE is located; selecting one or more candidate UEs for the sidelink-assisted position estimation procedure based at least in part upon the zone information; and performing the sidelink-assisted position estimation procedure with at least the selected one or more candidate UEs.

In some aspects, the zone information for some or all of the plurality of candidate UEs is broadcasted by the respective candidate UE.

In some aspects, the broadcasted zone information is transmitted via sidelink control information (SCI) of a physical sidelink control channel (PSCCH).

In some aspects, the zone information for some or all of the plurality of candidate UEs is received indirectly from a different respective UE or from a base station.

In some aspects, the zone information further includes an indication of accuracy for at least one zone identifier indication, and the selecting is further based on the indication of accuracy.

In some aspects, the indication of accuracy is indicated implicitly by the zone identifier, or the indication of accuracy is included in sidelink control information (SCI) of a physical sidelink control channel (PSCCH) or physical sidelink shared channel (PSSCH).

In some aspects, a mapping of zone identifiers to zones or instructions on how to derive the mapping are pre-defined, pre-configured, or received at the target UE from an external entity.

In some aspects, the selecting is further based upon one or more zone-based rules.

In some aspects, the one or more zone-based rules comprise: excluding, from selection, any candidate UE within a first threshold distance to the target UE, or excluding, from selection, any candidate UE in the same zone as the target UE, or excluding, from selection, any candidate UE that exceeds a second threshold distance to the target UE, or excluding, from selection, any candidate UE in any zone that exceeds a third threshold distance to respective zone of the target UE, or limiting selection of candidate UEs in the same zone to less than a first threshold number, or limiting selection of candidate UEs in an adjacent zone to the respective zone of the target UE to less than a second threshold number, or a combination thereof.

In some aspects, the method includes determining a reference signal received power (RSRP) of at least one signal from at least one of the plurality of candidate UEs, wherein the selecting is further based on the RSRP determination.

In some aspects, the method includes determining a line of sight (LOS) or non-LOS (NLOS) confidence level associated with at least one link to at least one of the plurality of candidate UEs, and wherein the selecting is further based on the LOS or NLOS confidence level determination.

In some aspects, the sidelink-assisted position estimation procedure comprises a timing measurement procedure, an angle measurement procedure, or a combination thereof.

In some aspects, each reference node associated with the sidelink-assisted position estimation procedures corresponds to the selected one or more candidate UEs.

In some aspects, at least one reference node associated with the sidelink-assisted position estimation procedures corresponds to a base station.

In an aspect, a target user equipment (UE) includes a memory; at least one transceiver; and at least one processor communicatively coupled to the memory and the at least one transceiver, the at least one processor configured to: receive, via the at least one transceiver, zone information associated with a set of zones, the zone information indicating, for each of a plurality of candidate UEs for a sidelink-assisted position estimation procedure of the target UE, a zone identifier of a zone in which the respective candidate UE is located; select one or more candidate UEs for the sidelink-assisted position estimation procedure based at least in part upon the zone information; and perform the sidelink-assisted position estimation procedure with at least the selected one or more candidate UEs.

In some aspects, the zone information for some or all of the plurality of candidate UEs is broadcasted by the respective candidate UE.

In some aspects, the broadcasted zone information is transmitted via sidelink control information (SCI) of a physical sidelink control channel (PSCCH).

In some aspects, the zone information for some or all of the plurality of candidate UEs is received indirectly from a different respective UE or from a base station.

In some aspects, the zone information further includes an indication of accuracy for at least one zone identifier indication, and the selection is further based on the indication of accuracy.

In some aspects, the indication of accuracy is indicated implicitly by the zone identifier, or the indication of accuracy is included in sidelink control information (SCI) of a physical sidelink control channel (PSCCH) or physical sidelink shared channel (PSSCH).

In some aspects, a mapping of zone identifiers to zones or instructions on how to derive the mapping are pre-defined, pre-configured, or received at the target UE from an external entity.

In some aspects, the selecting is further based upon one or more zone-based rules.

In some aspects, the one or more zone-based rules comprise: exclude, from selection, any candidate UE within a first threshold distance to the target UE, or exclude, from selection, any candidate UE in the same zone as the target UE, or exclude, from selection, any candidate UE that exceeds a second threshold distance to the target UE, or exclude, from selection, any candidate UE in any zone that exceeds a third threshold distance to respective zone of the target UE, or limit selection of candidate UEs in the same zone to less than a first threshold number, or limit selection of candidate UEs in an adjacent zone to the respective zone of the target UE to less than a second threshold number, or a combination thereof.

In some aspects, the at least one processor is further configured to: determine a reference signal received power (RSRP) of at least one signal from at least one of the plurality of candidate UEs, wherein the selection is further based on the RSRP determination.

In some aspects, the at least one processor is further configured to: determine a line of sight (LOS) or non-LOS (NLOS) confidence level associated with at least one link to at least one of the plurality of candidate UEs, and wherein the selection is further based on the LOS or NLOS confidence level determination.

In some aspects, the sidelink-assisted position estimation procedure comprises a timing measurement procedure, an angle measurement procedure, or a combination thereof.

In some aspects, each reference node associated with the sidelink-assisted position estimation procedures corresponds to the selected one or more candidate UEs.

In some aspects, at least one reference node associated with the sidelink-assisted position estimation procedures corresponds to a base station.

In an aspect, a target user equipment (UE) includes means for receiving zone information associated with a set of zones, the zone information indicating, for each of a plurality of candidate UEs for a sidelink-assisted position estimation procedure of the target UE, a zone identifier of a zone in which the respective candidate UE is located; means for selecting one or more candidate UEs for the sidelink-assisted position estimation procedure based at least in part upon the zone information; and means for performing the sidelink-assisted position estimation procedure with at least the selected one or more candidate UEs.

In some aspects, the zone information for some or all of the plurality of candidate UEs is broadcasted by the respective candidate UE.

In some aspects, the broadcasted zone information is transmitted via sidelink control information (SCI) of a physical sidelink control channel (PSCCH).

In some aspects, the zone information for some or all of the plurality of candidate UEs is received indirectly from a different respective UE or from a base station.

In some aspects, the zone information further includes an indication of accuracy for at least one zone identifier indication, and the selection is further based on the indication of accuracy.

In some aspects, the indication of accuracy is indicated implicitly by the zone identifier, or the indication of accuracy is included in sidelink control information (SCI) of a physical sidelink control channel (PSCCH) or physical sidelink shared channel (PSSCH).

In some aspects, a mapping of zone identifiers to zones or instructions on how to derive the mapping are pre-defined, pre-configured, or received at the target UE from an external entity.

In some aspects, the selecting is further based upon one or more zone-based rules.

In some aspects, the one or more zone-based rules comprise: excluding, from selection, any candidate UE within a first threshold distance to the target UE, or excluding, from selection, any candidate UE in the same zone as the target UE, or excluding, from selection, any candidate UE that exceeds a second threshold distance to the target UE, or excluding, from selection, any candidate UE in any zone that exceeds a third threshold distance to respective zone of the target UE, or limiting selection of candidate UEs in the same zone to less than a first threshold number, or limiting selection of candidate UEs in an adjacent zone to the respective zone of the target UE to less than a second threshold number, or a combination thereof.

In some aspects, the method includes means for determining a reference signal received power (RSRP) of at least one signal from at least one of the plurality of candidate UEs, wherein the selection is further based on the RSRP determination.

In some aspects, the method includes means for determining a line of sight (LOS) or non-LOS (NLOS) confidence level associated with at least one link to at least one of the plurality of candidate UEs, and wherein the selection is further based on the LOS or NLOS confidence level determination.

In some aspects, the sidelink-assisted position estimation procedure comprises a timing measurement procedure, an angle measurement procedure, or a combination thereof.

In some aspects, each reference node associated with the sidelink-assisted position estimation procedures corresponds to the selected one or more candidate UEs.

In some aspects, at least one reference node associated with the sidelink-assisted position estimation procedures corresponds to a base station.

In an aspect, a non-transitory computer-readable medium storing computer-executable instructions that, when executed by a target user equipment (UE), cause the target UE to: receive zone information associated with a set of zones, the zone information indicating, for each of a plurality of candidate UEs for a sidelink-assisted position estimation procedure of the target UE, a zone identifier of a zone in which the respective candidate UE is located; select one or more candidate UEs for the sidelink-assisted position estimation procedure based at least in part upon the zone information; and perform the sidelink-assisted position estimation procedure with at least the selected one or more candidate UEs.

In some aspects, the zone information for some or all of the plurality of candidate UEs is broadcasted by the respective candidate UE.

In some aspects, the broadcasted zone information is transmitted via sidelink control information (SCI) of a physical sidelink control channel (PSCCH).

In some aspects, the zone information for some or all of the plurality of candidate UEs is received indirectly from a different respective UE or from a base station.

In some aspects, the zone information further includes an indication of accuracy for at least one zone identifier indication, and the selection is further based on the indication of accuracy.

In some aspects, the indication of accuracy is indicated implicitly by the zone identifier, or the indication of accuracy is included in sidelink control information (SCI) of a physical sidelink control channel (PSCCH) or physical sidelink shared channel (PSSCH).

In some aspects, a mapping of zone identifiers to zones or instructions on how to derive the mapping are pre-defined, pre-configured, or received at the target UE from an external entity.

In some aspects, the selecting is further based upon one or more zone-based rules.

In some aspects, the one or more zone-based rules comprise: exclude, from selection, any candidate UE within a first threshold distance to the target UE, or exclude, from selection, any candidate UE in the same zone as the target UE, or exclude, from selection, any candidate UE that exceeds a second threshold distance to the target UE, or exclude, from selection, any candidate UE in any zone that exceeds a third threshold distance to respective zone of the target UE, or limit selection of candidate UEs in the same zone to less than a first threshold number, or limit selection of candidate UEs in an adjacent zone to the respective zone of the target UE to less than a second threshold number, or a combination thereof.

In some aspects, the one or more instructions further cause the UE to: determine a reference signal received power (RSRP) of at least one signal from at least one of the plurality of candidate UEs, wherein the selection is further based on the RSRP determination.

In some aspects, the one or more instructions further cause the UE to: determine a line of sight (LOS) or non-LOS (NLOS) confidence level associated with at least one link to at least one of the plurality of candidate UEs, and wherein the selection is further based on the LOS or NLOS confidence level determination.

In some aspects, the sidelink-assisted position estimation procedure comprises a timing measurement procedure, an angle measurement procedure, or a combination thereof.

In some aspects, each reference node associated with the sidelink-assisted position estimation procedures corresponds to the selected one or more candidate UEs.

In some aspects, at least one reference node associated with the sidelink-assisted position estimation procedures corresponds to a base station.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
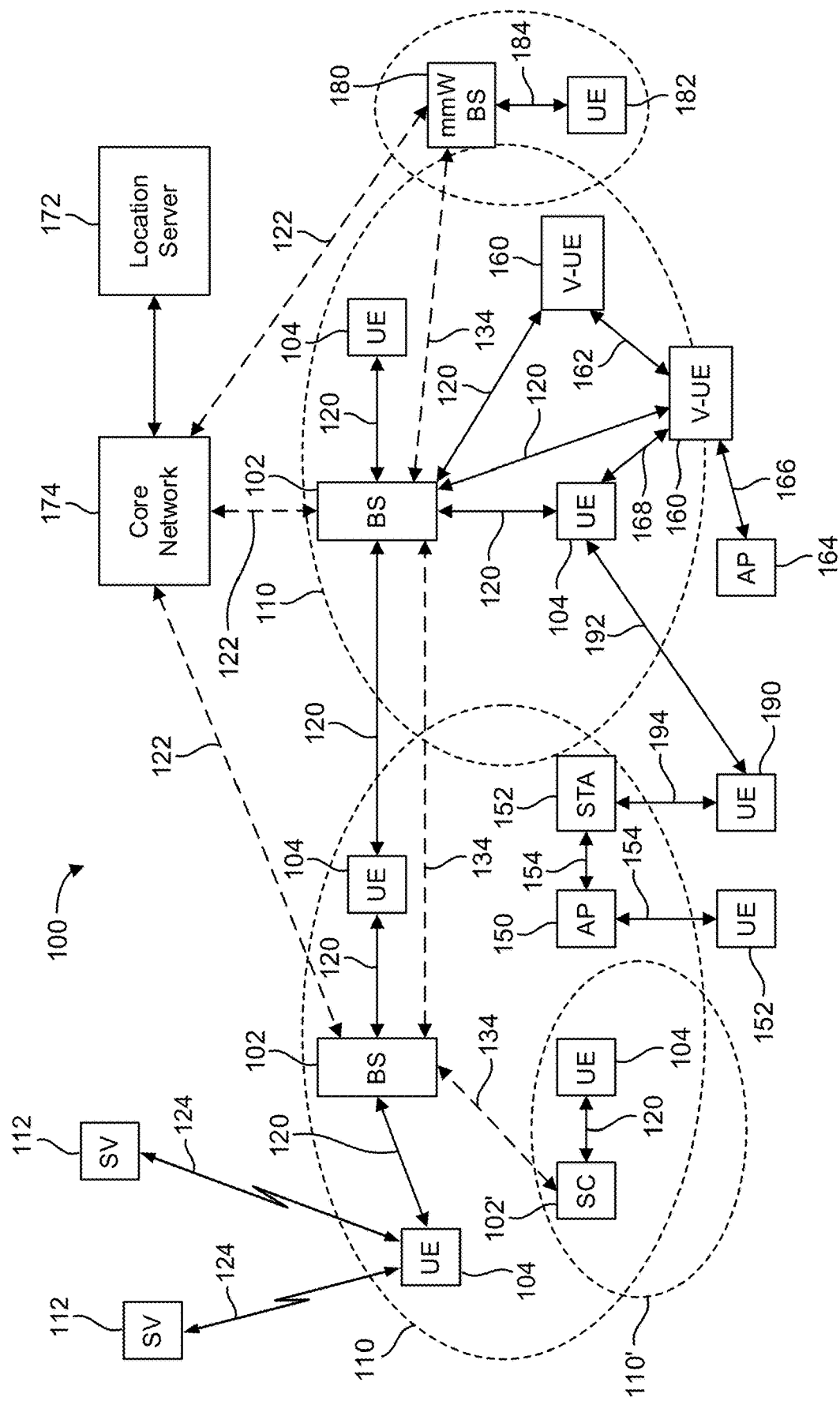
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE), "vehicle UE" (V-UE), "pedestrian UE" (P-UE), and "base station" are not intended to be specific or otherwise limited to any particular radio access technology (RAT), unless otherwise noted. In general, a UE may be any wireless communication device (e.g., vehicle on-board computer, vehicle navigation device, mobile phone, router, tablet computer, laptop computer, asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as a "mobile device," an "access terminal" or "AT," a "client device," a "wireless device," a "subscriber device," a "subscriber terminal," a "subscriber station," a "user terminal" or UT, a "mobile terminal," a "mobile station," or variations thereof.

A V-UE is a type of UE and may be any in-vehicle wireless communication device, such as a navigation system, a warning system, a heads-up display (HUD), an on-board computer, an in-vehicle infotainment system, an automated driving system (ADS), an advanced driver assistance system (ADAS), etc. Alternatively, a V-UE may be a portable wireless communication device (e.g., a cell phone, tablet computer, etc.) that is carried by the driver of the vehicle or a passenger in the vehicle. The term "V-UE" may refer to the in-vehicle wireless communication device or the vehicle itself, depending on the context. A P-UE is a type of UE and may be a portable wireless communication device that is carried by a pedestrian (i.e., a user that is not driving or riding in a vehicle). Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on Institute of Electrical and Electronics Engineers (IEEE) 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs including supporting data, voice and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference RF signals to UEs to be measured by the UEs and/or may receive and measure signals transmitted by the UEs. Such base stations may be referred to as positioning beacons (e.g., when transmitting RF signals to UEs) and/or as location measurement units (e.g., when receiving and measuring RF signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labelled "BS") and various UEs 104. The base stations 102 may include macro cell base stations (high power cellular base stations) and/or small cell base stations (low power cellular base stations). In an aspect, the macro cell base stations 102 may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 174 (e.g., an evolved packet core (EPC) or 5G core (5GC)) through backhaul links 122, and through the core network 174 to one or more location servers 172 (e.g., a location management function (LMF) or a secure user plane location (SUPL) location platform (SLP)). The location server(s) 172 may be part of core network 174 or may be external to core network 174. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labelled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a mmW base station 180 that may operate in millimeter wave (mmW) frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). mmW frequency bands generally include the FR2, FR3, and FR4 frequency ranges. As such, the terms "mmW" and "FR2" or "FR3" or "FR4" may generally be used interchangeably.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

Leveraging the increased data rates and decreased latency of NR, among other things, vehicle-to-everything (V2X) communication technologies are being implemented to support intelligent transportation systems (ITS) applications, such as wireless communications between vehicles (vehicle-to-vehicle (V2V)), between vehicles and the roadside infrastructure (vehicle-to-infrastructure (V2I)), and between vehicles and pedestrians (vehicle-to-pedestrian (V2P)). The goal is for vehicles to be able to sense the environment around them and communicate that information to other vehicles, infrastructure, and personal mobile devices. Such vehicle communication will enable safety, mobility, and environmental advancements that current technologies are unable to provide. Once fully implemented, the technology is expected to reduce unimpaired vehicle crashes by 80%.

Still referring to FIG. 1, the wireless communications system 100 may include multiple V-UEs 160 that may communicate with base stations 102 over communication links 120 (e.g., using the Uu interface). V-UEs 160 may also communicate directly with each other over a wireless sidelink 162, with a roadside access point 164 (also referred to as a "roadside unit") over a wireless sidelink 166, or with UEs 104 over a wireless sidelink 168. A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, V2V communication, V2X communication (e.g., cellular V2X (cV2X) communication, enhanced V2X (eV2X) communication, etc.), emergency rescue applications, etc. One or more of a group of V-UEs 160 utilizing sidelink communications may be within the geographic coverage area 110 of a base station 102. Other V-UEs 160 in such a group may be outside the geographic coverage area 110 of a base station 102 or be otherwise unable to receive transmissions from a base station 102. In some cases, groups of V-UEs 160 communicating via sidelink communications may utilize a one-to-many (1:M) system in which each V-UE 160 transmits to every other V-UE 160 in the group. In some cases, a base station 102 facilitates the scheduling of resources for sidelink communications. In other cases, sidelink communications are carried out between V-UEs 160 without the involvement of a base station 102.

In an aspect, the sidelinks 162, 166, 168 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs.

In an aspect, the sidelinks 162, 166, 168 may be cV2X links. A first generation of cV2X has been standardized in LTE, and the next generation is expected to be defined in NR. cV2X is a cellular technology that also enables device-to-device communications. In the U.S. and Europe, cV2X is expected to operate in the licensed ITS band in sub-6 GHz. Other bands may be allocated in other countries. Thus, as a particular example, the medium of interest utilized by sidelinks 162, 166, 168 may correspond to at least a portion of the licensed ITS frequency band of sub-6 GHz. However, the present disclosure is not limited to this frequency band or cellular technology.

In an aspect, the sidelinks 162, 166, 168 may be dedicated short-range communications (DSRC) links. DSRC is a one-way or two-way short-range to medium-range wireless communication protocol that uses the wireless access for vehicular environments (WAVE) protocol, also known as IEEE 802.11p, for V2V, V2I, and V2P communications. IEEE 802.11p is an approved amendment to the IEEE 802.11 standard and operates in the licensed ITS band of 5.9 GHz (5.85-5.925 GHz) in the U.S. In Europe, IEEE 802.11p operates in the ITS GSA band (5.875-5.905 MHz). Other bands may be allocated in other countries. The V2V communications briefly described above occur on the Safety Channel, which in the U.S. is typically a 10 MHz channel that is dedicated to the purpose of safety. The remainder of the DSRC band (the total bandwidth is 75 MHz) is intended for other services of interest to drivers, such as road rules, tolling, parking automation, etc. Thus, as a particular example, the mediums of interest utilized by sidelinks 162, 166, 168 may correspond to at least a portion of the licensed ITS frequency band of 5.9 GHz.

Alternatively, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Communications between the V-UEs 160 are referred to as V2V communications, communications between the V-UEs 160 and the one or more roadside access points 164 are referred to as V2I communications, and communications between the V-UEs 160 and one or more UEs 104 (where the UEs 104 are P-UEs) are referred to as V2P communications. The V2V communications between V-UEs 160 may include, for example, information about the position, speed, acceleration, heading, and other vehicle data of the V-UEs 160. The V2I information received at a V-UE 160 from the one or more roadside access points 164 may include, for example, road rules, parking automation information, etc. The V2P communications between a V-UE 160 and a UE 104 may include information about, for example, the position, speed, acceleration, and heading of the V-UE 160 and the position, speed (e.g., where the UE 104 is carried by a user on a bicycle), and heading of the UE 104.

Note that although FIG. 1 only illustrates two of the UEs as V-UEs (V-UEs 160), any of the illustrated UEs (e.g., UEs 104, 152, 182, 190) may be V-UEs. In addition, while only the V-UEs 160 and a single UE 104 have been illustrated as being connected over a sidelink, any of the UEs illustrated in FIG. 1, whether V-UEs, P-UEs, etc., may be capable of sidelink communication. Further, although only UE 182 was described as being capable of beam forming, any of the illustrated UEs, including V-UEs 160, may be capable of beam forming. Where V-UEs 160 are capable of beam forming, they may beam form towards each other (i.e., towards other V-UEs 160), towards roadside access points 164, towards other UEs (e.g., UEs 104, 152, 182, 190), etc. Thus, in some cases, V-UEs 160 may utilize beamforming over sidelinks 162, 166, and 168.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on. As another example, the D2D P2P links 192 and 194 may be sidelinks, as described above with reference to sidelinks 162, 166, and 168.

Figure 2A:
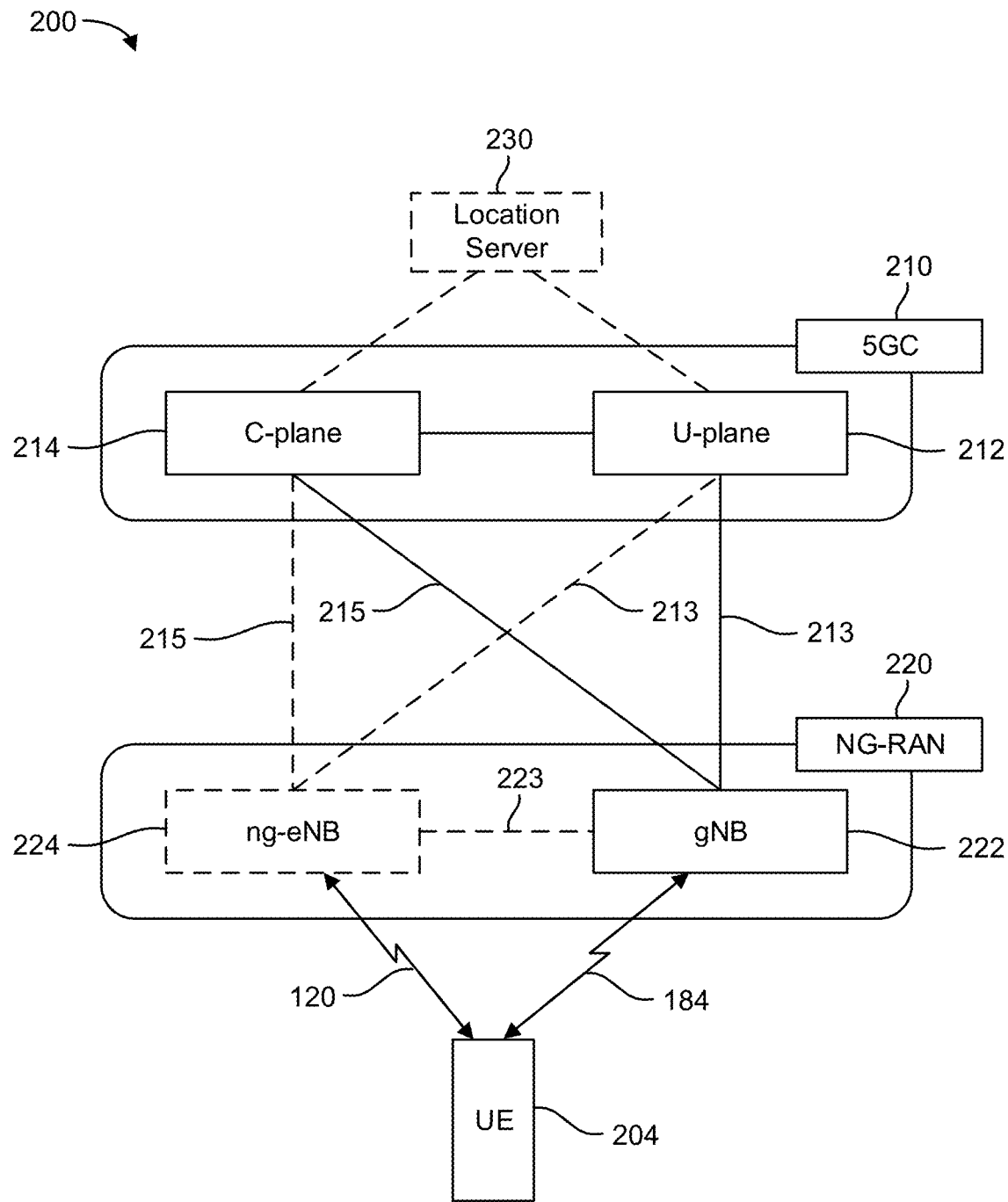
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
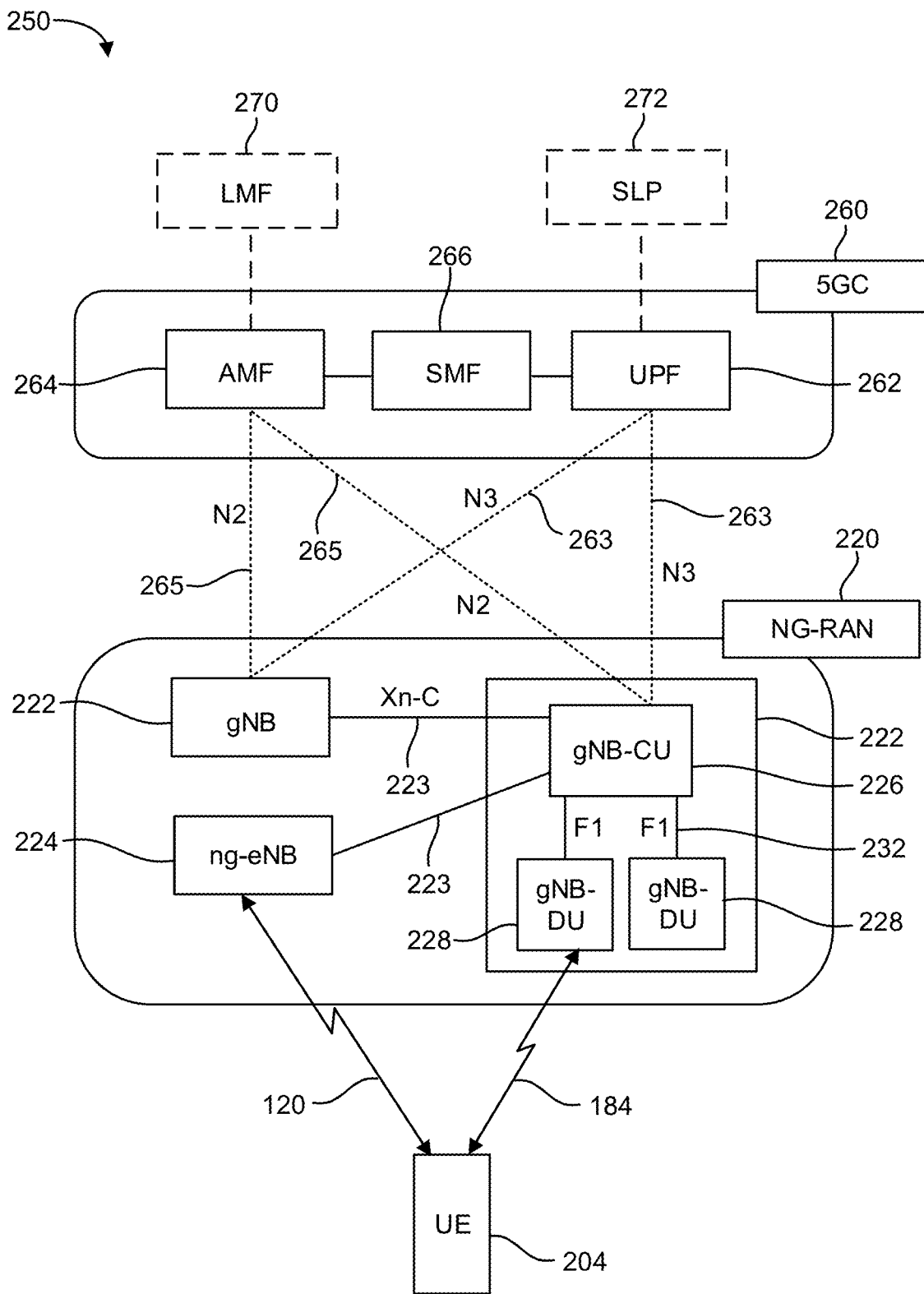

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 is divided between a gNB central unit (gNB-CU) 226 and one or more gNB distributed units (gNB-DUs) 228. The interface 232 between the gNB-CU 226 and the one or more gNB-DUs 228 is referred to as the "F1" interface. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 hosts the radio resource control (RRC), service data adaptation protocol (SDAP), and packet data convergence protocol (PDCP) protocols of the gNB 222. A gNB-DU 228 is a logical node that hosts the radio link control (RLC), medium access control (MAC), and physical (PHY) layers of the gNB 222. Its operation is controlled by the gNB-CU 226. One gNB-DU 228 can support one or more cells, and one cell is supported by only one gNB-DU 228. Thus, a UE 204 communicates with the gNB-CU 226 via the RRC, SDAP, and PDCP layers and with a gNB-DU 228 via the RLC, MAC, and PHY layers.

Figure 3A:
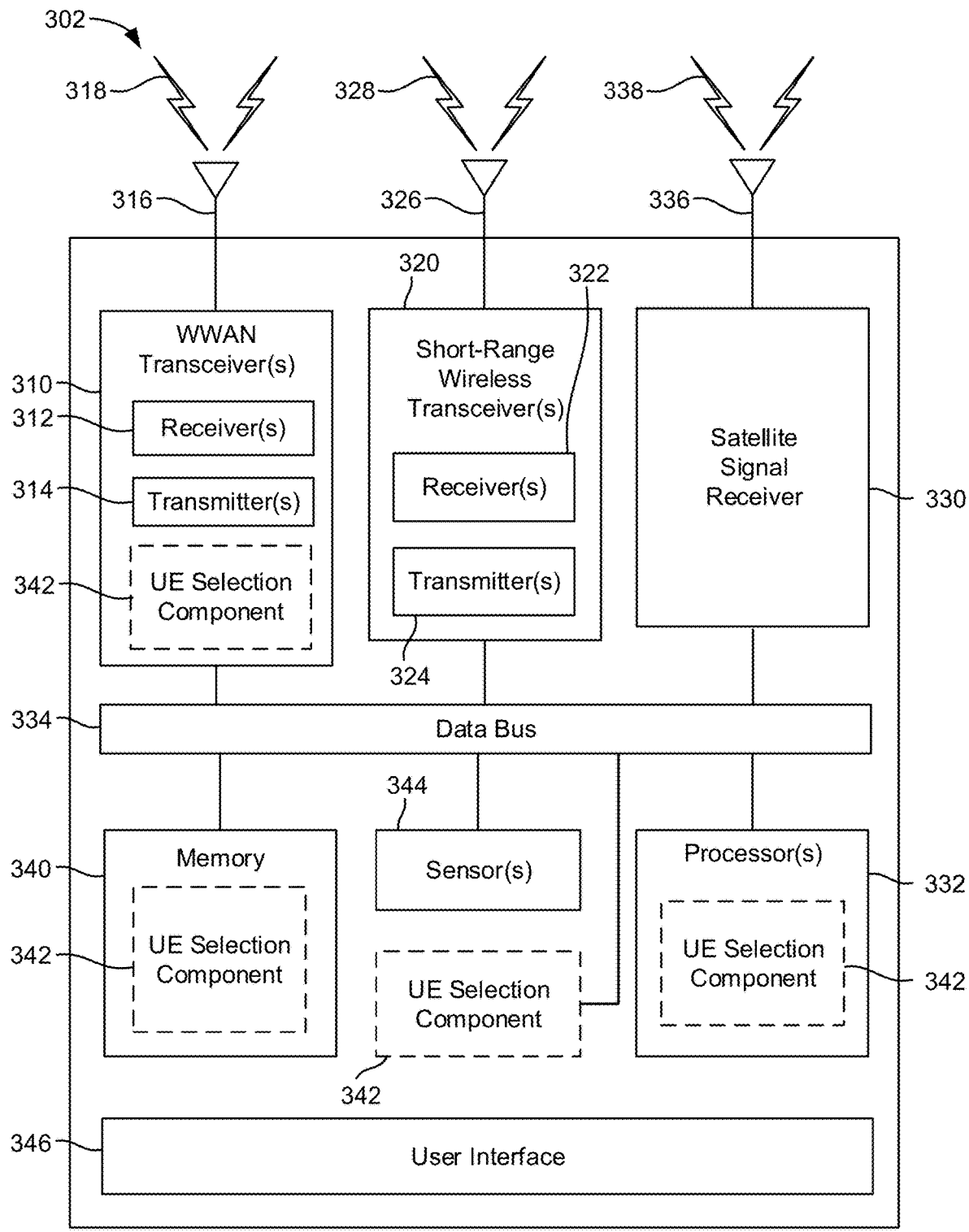
FIGS. 3A, 3B, and 3C are simplified block diagrams of several sample aspects of components that may be employed in a user equipment (UE), a base station, and a network entity, respectively, and configured to support communications as taught herein.
Figure 3B:
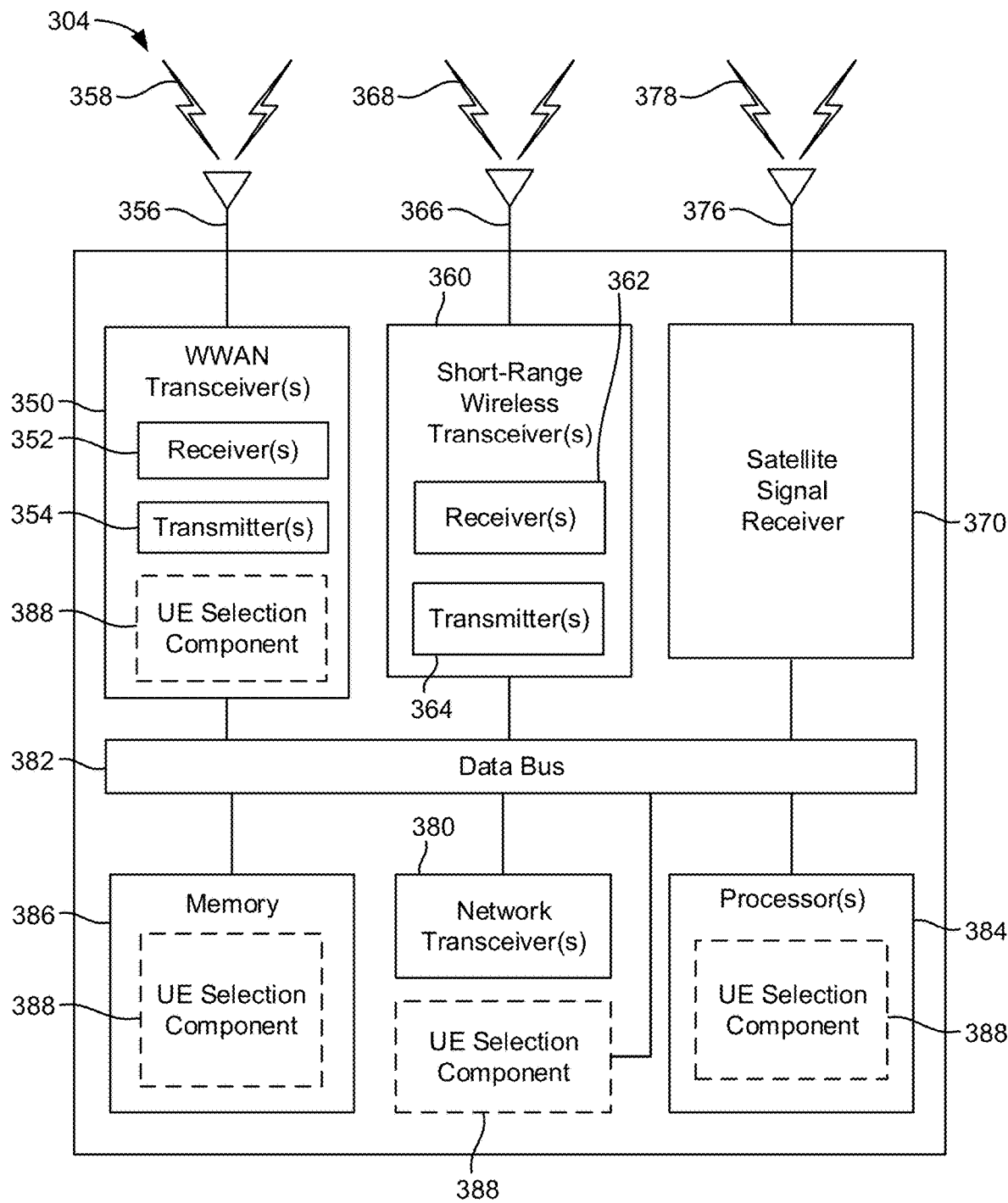
Figure 3C:
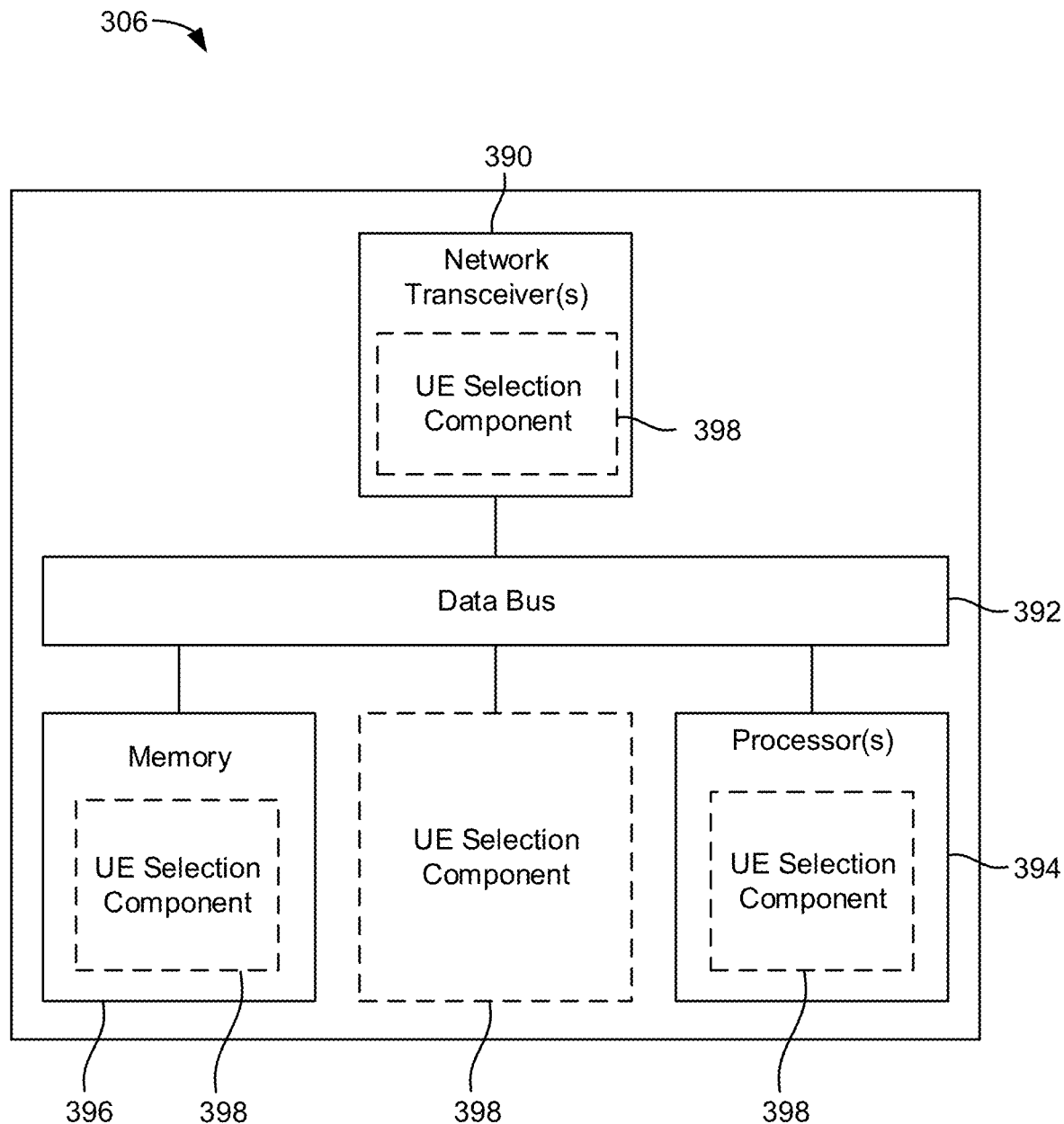

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include UE selection component 342, 388, and 398, respectively. The UE selection component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the UE selection component 342, 388, and 398 may be external to the processors 332, 384, and 394 (e.g., part of a modem processing system, integrated with another processing system, etc.). Alternatively, the UE selection component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the UE selection component 342, which may be, for example, part of the one or more WWAN transceivers 310, the memory 340, the one or more processors 332, or any combination thereof, or may be a standalone component. FIG. 3B illustrates possible locations of the UE selection component 388, which may be, for example, part of the one or more WWAN transceivers 350, the memory 386, the one or more processors 384, or any combination thereof, or may be a standalone component. FIG. 3C illustrates possible locations of the UE selection component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver (s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the UE selection component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Note that the UE 302 illustrated in FIG. 3A may represent a "low-tier" UE or a "premium" UE. As described further below, while low-tier and premium UEs may have the same types of components (e.g., both may have WWAN transceivers 310, processing systems 332, memory components 340, etc.), the components may have different degrees of functionality (e.g., increased or decreased performance, more or fewer capabilities, etc.) depending on whether the UE 302 corresponds to a low-tier UE or a premium UE.

UEs may be classified as low-tier UEs (e.g., wearables, such as smart watches, glasses, rings, etc.) and premium UEs (e.g., smartphones, tablet computers, laptop computers, etc.). Low-tier UEs may alternatively be referred to as reduced-capability NR UEs, reduced-capability UEs, NR light UEs, light UEs, NR super light UEs, or super light UEs. Premium UEs may alternatively be referred to as full-capability UEs or simply UEs. Low-tier UEs generally have lower baseband processing capability, fewer antennas (e.g., one receiver antenna as baseline in FR1 or FR2, two receiver antennas optionally), lower operational bandwidth capabilities (e.g., 20 MHz for FR1 with no supplemental uplink or carrier aggregation, or 50 or 100 MHz for FR2), only half duplex frequency division duplex (HD-FDD) capability, smaller HARQ buffer, reduced physical downlink control channel (PDCCH) monitoring, restricted modulation (e.g., 64 QAM for downlink and 16 QAM for uplink), relaxed processing timeline requirements, and/or lower uplink transmission power compared to premium UEs. Different UE tiers can be differentiated by UE category and/or by UE capability. For example, certain types of UEs may be assigned a classification (e.g., by the original equipment manufacturer (OEM), the applicable wireless communications standards, or the like) of "low-tier" and other types of UEs may be assigned a classification of "premium." Certain tiers of UEs may also report their type (e.g., "low-tier" or "premium") to the network. Additionally, certain resources and/or channels may be dedicated to certain types of UEs.

As will be appreciated, the accuracy of low-tier UE positioning may be limited. For example, a low-tier UE may operate on a reduced bandwidth, such as 5 to 20 MHz for wearable devices and "relaxed" IoT devices (i.e., IoT devices with relaxed, or lower, capability parameters, such as lower throughput, relaxed delay requirements, lower energy consumption, etc.), which results in lower positioning accuracy. As another example, a low-tier UE's receive processing capability may be limited due to its lower cost RF/baseband. As such, the reliability of measurements and positioning computations would be reduced. In addition, such a low-tier UE may not be able to receive multiple PRS from multiple TRPs, further reducing positioning accuracy. As yet another example, the transmit power of a low-tier UE may be reduced, meaning there would be a lower quality of uplink measurements for low-tier UE positioning.

Premium UEs generally have a larger form factor and are costlier than low-tier UEs, and have more features and capabilities than low-tier UEs. For example, with respect to positioning, a premium UE may operate on the full PRS bandwidth, such as 100 MHz, and measure PRS from more TRPs than low-tier UEs, both of which result in higher positioning accuracy. As another example, a premium UE's receive processing capability may be higher (e.g., faster) due to its higher-capability RF/baseband. In addition, the transmit power of a premium UE may be higher than that of a low-tier UE. As such, the reliability of measurements and positioning computations would be increased.

Figure 4:
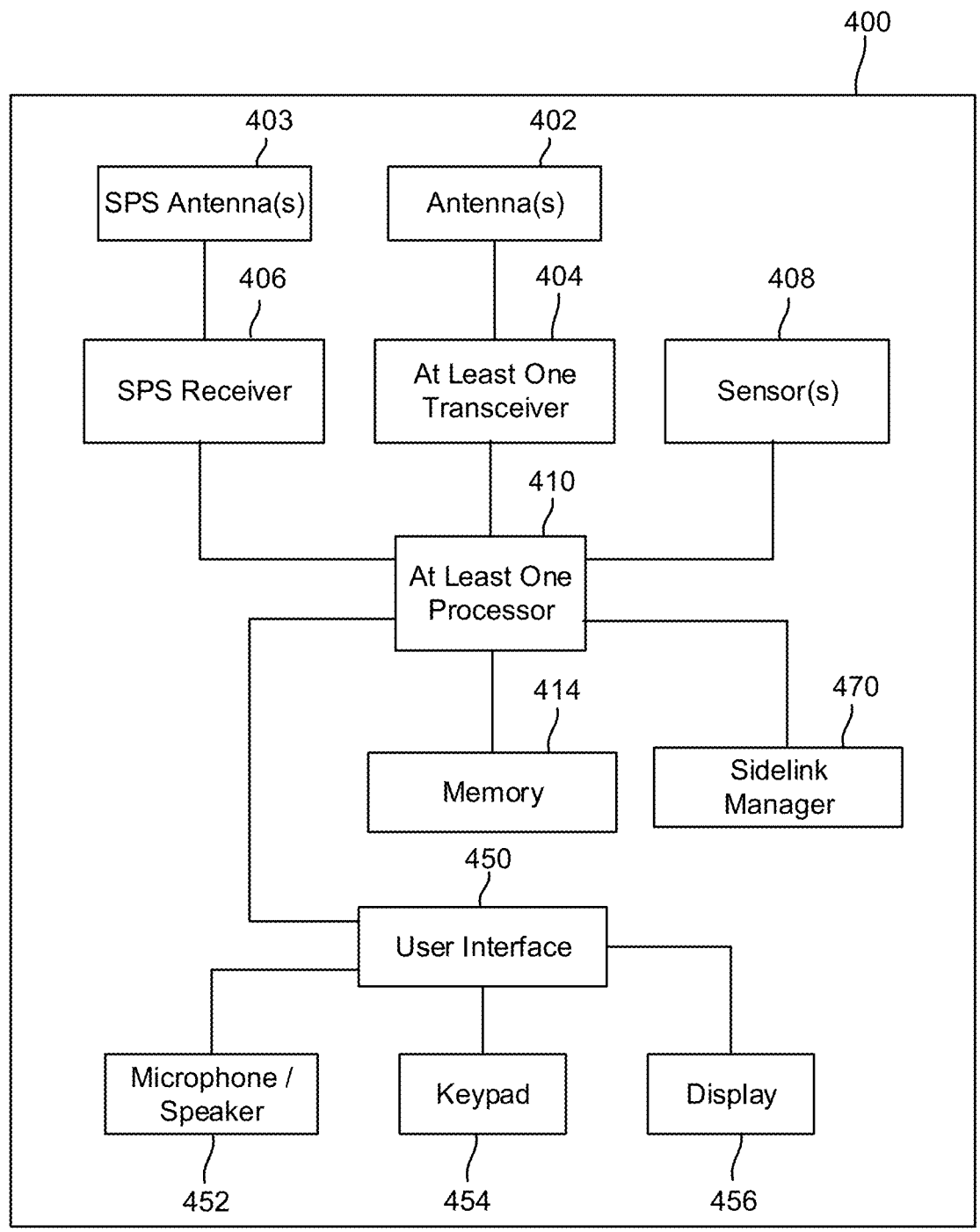
FIG. 4 is a block diagram illustrating various components of an example user equipment (UE), according to aspects of the disclosure.

FIG. 4 is a block diagram illustrating various components of an example UE 400, according to aspects of the disclosure. In an aspect, the UE 400 may correspond to any of the UEs described herein (e.g., an example implementation of UE 302, etc.). As a specific example, the UE 400 may be a V-UE, such as V-UE 160 in FIG. 1. For the sake of simplicity, the various features and functions illustrated in the block diagram of FIG. 4 are connected together using a common data bus that is meant to represent that these various features and functions are operatively coupled together. Those skilled in the art will recognize that other connections, mechanisms, features, functions, or the like, may be provided and adapted as necessary to operatively couple and configure an actual UE. Further, it is also recognized that one or more of the features or functions illustrated in the example of FIG. 4 may be further subdivided, or two or more of the features or functions illustrated in FIG. 4 may be combined.

The UE 400 may include at least one transceiver 404 connected to one or more antennas 402 and providing means for communicating (e.g., means for transmitting, means for receiving, means for measuring, means for tuning, means for refraining from transmitting, etc.) with other network nodes, such as V-UEs (e.g., V-UEs 160), infrastructure access points (e.g., roadside access point 164), P-UEs (e.g., UEs 104), base stations (e.g., base stations 102), etc., via at least one designated RAT (e.g., cV2X or IEEE 802.11p) over one or more communication links (e.g., communication links 120, sidelinks 162, 166, 168, mmW communication link 184). The at least one transceiver 404 may be variously configured for transmitting and encoding signals (e.g., messages, indications, information, and so on), and, conversely, for receiving and decoding signals (e.g., messages, indications, information, pilots, and so on) in accordance with the designated RAT. In an aspect, the at least one transceiver 404 and the antenna(s) 402 may form a (wireless) communication interface of the UE 400.

As used herein, a "transceiver" may include at least one transmitter and at least one receiver in an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antenna(s) 402), such as an antenna array, that permits the UE 400 to perform transmit "beamforming," as described herein. Similarly, a receiver may include or be coupled to a plurality of antennas (e.g., antenna(s) 402), such as an antenna array, that permits the UE 400 to perform receive beamforming, as described herein. In an aspect, the transmitter(s) and receiver(s) may share the same plurality of antennas (e.g., antenna(s) 402), such that the UE 400 can only receive or transmit at a given time, not both at the same time. In some cases, a transceiver may not provide both transmit and receive functionalities. For example, a low functionality receiver circuit may be employed in some designs to reduce costs when providing full communication is not necessary (e.g., a receiver chip or similar circuitry simply providing low-level sniffing).

The UE 400 may also include a satellite positioning system (SPS) receiver 406. The SPS receiver 406 may be connected to one or more SPS antennas 402 and may provide means for receiving and/or measuring satellite signals. The SPS receiver 406 may comprise any suitable hardware and/or software for receiving and processing SPS signals, such as global positioning system (GPS) signals. The SPS receiver 406 requests information and operations as appropriate from the other systems, and performs the calculations necessary to determine the UE's 400 position using measurements obtained by any suitable SPS algorithm.

One or more sensors 408 may be coupled to at least one processor 410 and may provide means for sensing or detecting information related to the state and/or environment of the UE 400, such as speed, heading (e.g., compass heading), headlight status, gas mileage, etc. By way of example, the one or more sensors 408 may include a speedometer, a tachometer, an accelerometer (e.g., a microelectromechanical systems (MEMS) device), a gyroscope, a geomagnetic sensor (e.g., a compass), an altimeter (e.g., a barometric pressure altimeter), etc.

The at least one processor 410 may include one or more central processing units (CPUs), microprocessors, microcontrollers, ASICs, processing cores, digital signal processors (DSPs), field-programmable gate arrays (FPGAs), or the like that provide processing functions, as well as other calculation and control functionality. The at least one processor 410 may therefore provide means for processing, such as means for determining, means for calculating, means for receiving, means for transmitting, means for indicating, etc. The at least one processor 410 may include any form of logic suitable for performing, or causing the components of the UE 400 to perform, at least the techniques described herein.

The at least one processor 410 may also be coupled to a memory 414 providing means for storing (including means for retrieving, means for maintaining, etc.) data and software instructions for executing programmed functionality within the UE 400. The memory 414 may be on-board the at least one processor 410 (e.g., within the same integrated circuit (IC) package), and/or the memory 414 may be external to the at least one processor 410 and functionally coupled over a data bus.

The UE 400 may include a user interface 450 that provides any suitable interface systems, such as a microphone/speaker 452, keypad 454, and display 456 that allow user interaction with the UE 400. The microphone/speaker 452 may provide for voice communication services with the UE 400. The keypad 454 may comprise any suitable buttons for user input to the UE 400. The display 456 may comprise any suitable display, such as, for example, a backlit liquid crystal display (LCD), and may further include a touch screen display for additional user input modes. The user interface 450 may therefore be a means for providing indications (e.g., audible and/or visual indications) to a user and/or for receiving user input (e.g., via user actuation of a sensing device such a keypad, a touch screen, a microphone, and so on).

In an aspect, the UE 400 may include a sidelink manager 470 coupled to the at least one processor 410. The sidelink manager 470 may be a hardware, software, or firmware component that, when executed, causes the UE 400 to perform the operations described herein. For example, the sidelink manager 470 may be a software module stored in memory 414 and executable by the at least one processor 410. As another example, the sidelink manager 470 may be a hardware circuit (e.g., an ASIC, a field-programmable gate array (FPGA), etc.) within the UE 400.

Figure 5:
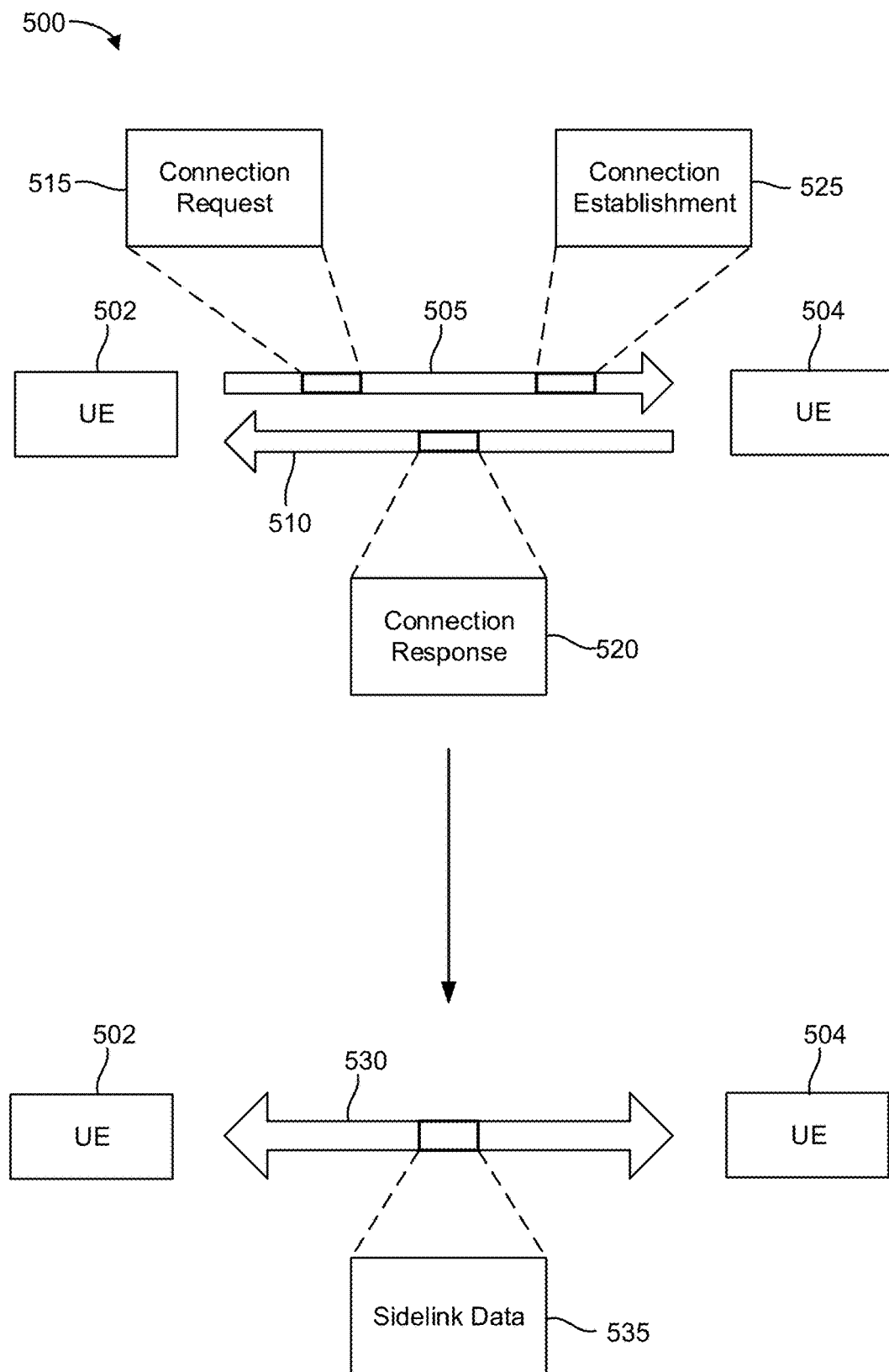
FIG. 5 illustrates an example of a wireless communications system that supports unicast sidelink establishment, according to aspects of the disclosure.

FIG. 5 illustrates an example of a wireless communications system 500 that supports wireless unicast sidelink establishment, according to aspects of the disclosure. In some examples, wireless communications system 500 may implement aspects of wireless communications systems 100, 200, and 250. Wireless communications system 500 may include a first UE 502 and a second UE 504, which may be examples of any of the UEs described herein. As specific examples, UEs 502 and 504 may correspond to V-UEs 160 in FIG. 1, UE 190 and UE 104 in FIG. 1 connected over D2D P2P link 192, or UEs 204 in FIGS. 2A and 2B.

In the example of FIG. 5, the UE 502 may attempt to establish a unicast connection over a sidelink with the UE 504, which may be a V2X sidelink between the UE 502 and UE 504. As specific examples, the established sidelink connection may correspond to sidelinks 162 and/or 168 in FIG. 1. The sidelink connection may be established in an omni-directional frequency range (e.g., FR1) and/or a mmW frequency range (e.g., FR2). In some cases, the UE 502 may be referred to as an initiating UE that initiates the sidelink connection procedure, and the UE 504 may be referred to as a target UE that is targeted for the sidelink connection procedure by the initiating UE.

For establishing the unicast connection, access stratum (AS) (a functional layer in the UMTS and LTE protocol stacks between the RAN and the UE that is responsible for transporting data over wireless links and managing radio resources, and which is part of Layer 2) parameters may be configured and negotiated between the UE 502 and UE 504. For example, a transmission and reception capability matching may be negotiated between the UE 502 and UE 504. Each UE may have different capabilities (e.g., transmission and reception, 64 quadrature amplitude modulation (QAM), transmission diversity, carrier aggregation (CA), supported communications frequency band(s), etc.). In some cases, different services may be supported at the upper layers of corresponding protocol stacks for UE 502 and UE 504. Additionally, a security association may be established between UE 502 and UE 504 for the unicast connection. Unicast traffic may benefit from security protection at a link level (e.g., integrity protection). Security requirements may differ for different wireless communications systems. For example, V2X and Uu systems may have different security requirements (e.g., Uu security does not include confidentiality protection). Additionally, IP configurations (e.g., IP versions, addresses, etc.) may be negotiated for the unicast connection between UE 502 and UE 504.

In some cases, UE 504 may create a service announcement (e.g., a service capability message) to transmit over a cellular network (e.g., cV2X) to assist the sidelink connection establishment. Conventionally, UE 502 may identify and locate candidates for sidelink communications based on a basic service message (BSM) broadcasted unencrypted by nearby UEs (e.g., UE 504). The BSM may include location information, security and identity information, and vehicle information (e.g., speed, maneuver, size, etc.) for the corresponding UE. However, for different wireless communications systems (e.g., D2D or V2X communications), a discovery channel may not be configured so that UE 502 is able to detect the BSM(s). Accordingly, the service announcement transmitted by UE 504 and other nearby UEs (e.g., a discovery signal) may be an upper layer signal and broadcasted (e.g., in an NR sidelink broadcast). In some cases, the UE 504 may include one or more parameters for itself in the service announcement, including connection parameters and/or capabilities it possesses. The UE 502 may then monitor for and receive the broadcasted service announcement to identify potential UEs for corresponding sidelink connections. In some cases, the UE 502 may identify the potential UEs based on the capabilities each UE indicates in their respective service announcements.

The service announcement may include information to assist the UE 502 (e.g., or any initiating UE) to identify the UE transmitting the service announcement (UE 504 in the example of FIG. 5). For example, the service announcement may include channel information where direct communication requests may be sent. In some cases, the channel information may be RAT-specific (e.g., specific to LTE or NR) and may include a resource pool within which UE 502 transmits the communication request. Additionally, the service announcement may include a specific destination address for the UE (e.g., a Layer 2 destination address) if the destination address is different from the current address (e.g., the address of the streaming provider or UE transmitting the service announcement). The service announcement may also include a network or transport layer for the UE 502 to transmit a communication request on. For example, the network layer (also referred to as "Layer 3" or "L3") or the transport layer (also referred to as "Layer 4" or "L4") may indicate a port number of an application for the UE transmitting the service announcement. In some cases, no IP addressing may be needed if the signaling (e.g., PC5 signaling) carries a protocol (e.g., a real-time transport protocol (RTP)) directly or gives a locally-generated random protocol. Additionally, the service announcement may include a type of protocol for credential establishment and QoS-related parameters.

After identifying a potential sidelink connection target (UE 504 in the example of FIG. 5), the initiating UE (UE 502 in the example of FIG. 5) may transmit a connection request 515 to the identified target UE 504. In some cases, the connection request 515 may be a first RRC message transmitted by the UE 502 to request a unicast connection with the UE 504 (e.g., an "RRCDirectConnectionSetupRequest" message). For example, the unicast connection may utilize the PC5 interface for the sidelink, and the connection request 515 may be an RRC connection setup request message. Additionally, the UE 502 may use a sidelink signaling radio bearer 505 to transport the connection request 515.

After receiving the connection request 515, the UE 504 may determine whether to accept or reject the connection request 515. The UE 504 may base this determination on a transmission/reception capability, an ability to accommodate the unicast connection over the sidelink, a particular service indicated for the unicast connection, the contents to be transmitted over the unicast connection, or a combination thereof. For example, if the UE 502 wants to use a first RAT to transmit or receive data, but the UE 504 does not support the first RAT, then the UE 504 may reject the connection request 515. Additionally or alternatively, the UE 504 may reject the connection request 515 based on being unable to accommodate the unicast connection over the sidelink due to limited radio resources, a scheduling issue, etc. Accordingly, the UE 504 may transmit an indication of whether the request is accepted or rejected in a connection response 520. Similar to the UE 502 and the connection request 515, the UE 504 may use a sidelink signaling radio bearer 510 to transport the connection response 520. Additionally, the connection response 520 may be a second RRC message transmitted by the UE 504 in response to the connection request 515 (e.g., an "RRCDirectConnectionResponse" message).

In some cases, sidelink signaling radio bearers 505 and 510 may be the same sidelink signaling radio bearer or may be separate sidelink signaling radio bearers. Accordingly, a radio link control (RLC) layer acknowledged mode (AM) may be used for sidelink signaling radio bearers 505 and 510. A UE that supports the unicast connection may listen on a logical channel associated with the sidelink signaling radio bearers. In some cases, the AS layer (i.e., Layer 2) may pass information directly through RRC signaling (e.g., control plane) instead of a V2X layer (e.g., data plane).

If the connection response 520 indicates that the UE 504 accepted the connection request 515, the UE 502 may then transmit a connection establishment 525 message on the sidelink signaling radio bearer 505 to indicate that the unicast connection setup is complete. In some cases, the connection establishment 525 may be a third RRC message (e.g., an "RRCDirectConnectionSetupComplete" message). Each of the connection request 515, the connection response 520, and the connection establishment 525 may use a basic capability when being transported from one UE to the other UE to enable each UE to be able to receive and decode the corresponding transmission (e.g., the RRC messages).

Additionally, identifiers may be used for each of the connection request 515, the connection response 520, and the connection establishment 525. For example, the identifiers may indicate which UE 502/504 is transmitting which message and/or for which UE 502/504 the message is intended. For physical (PHY) layer channels, the RRC signaling and any subsequent data transmissions may use the same identifier (e.g., Layer 2 IDs). However, for logical channels, the identifiers may be separate for the RRC signaling and for the data transmissions. For example, on the logical channels, the RRC signaling and the data transmissions may be treated differently and have different acknowledgement (ACK) feedback messaging. In some cases, for the RRC messaging, a physical layer ACK may be used for ensuring the corresponding messages are transmitted and received properly.

One or more information elements may be included in the connection request 515 and/or the connection response 520 for UE 502 and/or UE 504, respectively, to enable negotiation of corresponding AS layer parameters for the unicast connection. For example, the UE 502 and/or UE 504 may include packet data convergence protocol (PDCP) parameters in a corresponding unicast connection setup message to set a PDCP context for the unicast connection. In some cases, the PDCP context may indicate whether or not PDCP duplication is utilized for the unicast connection. Additionally, the UE 502 and/or UE 504 may include RLC parameters when establishing the unicast connection to set an RLC context for the unicast connection. For example, the RLC context may indicate whether an AM (e.g., a reordering timer (t-reordering) is used) or an unacknowledged mode (UM) is used for the RLC layer of the unicast communications.

Additionally, the UE 502 and/or UE 504 may include medium access control (MAC) parameters to set a MAC context for the unicast connection. In some cases, the MAC context may enable resource selection algorithms, a hybrid automatic repeat request (HARQ) feedback scheme (e.g., ACK or negative ACK (NACK) feedback), parameters for the HARQ feedback scheme, carrier aggregation, or a combination thereof for the unicast connection. Additionally, the UE 502 and/or UE 504 may include PHY layer parameters when establishing the unicast connection to set a PHY layer context for the unicast connection. For example, the PHY layer context may indicate a transmission format (unless transmission profiles are included for each UE 502/504) and a radio resource configuration (e.g., bandwidth part (BWP), numerology, etc.) for the unicast connection. These information elements may be supported for different frequency range configurations (e.g., FR1 and FR2).

In some cases, a security context may also be set for the unicast connection (e.g., after the connection establishment 525 message is transmitted). Before a security association (e.g., security context) is established between the UE 502 and UE 504, the sidelink signaling radio bearers 505 and 510 may not be protected. After a security association is established, the sidelink signaling radio bearers 505 and 510 may be protected. Accordingly, the security context may enable secure data transmissions over the unicast connection and the sidelink signaling radio bearers 505 and 510. Additionally, IP layer parameters (e.g., link-local IPv4 or IPv6 addresses) may also be negotiated. In some cases, the IP layer parameters may be negotiated by an upper layer control protocol running after RRC signaling is established (e.g., the unicast connection is established). As noted above, the UE 504 may base its decision on whether to accept or reject the connection request 515 on a particular service indicated for the unicast connection and/or the contents to be transmitted over the unicast connection (e.g., upper layer information). The particular service and/or contents may be also indicated by an upper layer control protocol running after RRC signaling is established.

After the unicast connection is established, the UE 502 and UE 504 may communicate using the unicast connection over a sidelink 530, where sidelink data 535 is transmitted between the two UEs 502 and 504. The sidelink 530 may correspond to sidelinks 162 and/or 168 in FIG. 1. In some cases, the sidelink data 535 may include RRC messages transmitted between the two UEs 502 and 504. To maintain this unicast connection on sidelink 530, UE 502 and/or UE 504 may transmit a keep alive message (e.g., "RRCDirectLinkAlive" message, a fourth RRC message, etc.). In some cases, the keep alive message may be triggered periodically or on-demand (e.g., event-triggered). Accordingly, the triggering and transmission of the keep alive message may be invoked by UE 502 or by both UE 502 and UE 504. Additionally or alternatively, a MAC control element (CE) (e.g., defined over sidelink 530) may be used to monitor the status of the unicast connection on sidelink 530 and maintain the connection. When the unicast connection is no longer needed (e.g., UE 502 travels far enough away from UE 504), either UE 502 and/or UE 504 may start a release procedure to drop the unicast connection over sidelink 530. Accordingly, subsequent RRC messages may not be transmitted between UE 502 and UE 504 on the unicast connection.

Various physical sidelink channels can be used for sidelink communication and/or RF-EH, including Physical sidelink control channel (PSCCH), Physical sidelink shared channel (PSSCH), Physical sidelink feedback channel (PSFCH), and Physical sidelink broadcast channel (PSBCH). Various sidelink reference signals can be used for sidelink communication and/or RF-EH, including Demodulation RS (DMRS) for PSCCH, Demodulation RS (DMRS) for PSSCH, Demodulation RS (DMRS) for PSBCH, Channel state information RS (CSI-RS), Primary synchronization signal (S-PSS), Secondary synchronization signal (S-SSS), and Phase-tracking RS (PTRS) for FR2 only.

In some designs, a slot may include 14 OFDM symbols including resource arranged in accordance with a time division duplex (TDD) resource configuration. In some designs, sidelink can be configured (e.g., pre-configured or dynamically configured) to occupy fewer than 14 symbols in a slot. In some designs, the first symbol is repeated on the preceding symbol for automatic gain control (AGC) settling. In some designs, the sub-channel size can be configured (e.g., pre-configured or dynamically configured) to {10, 15, 20, 25, 50, 75, 100} physical resource blocks (PRBs). In some designs, the PSCCH and PSSCH are always transmitted in the same slot.

In some designs, to receive a sidelink packet, a UE performs blind decoding in all sidelink sub-channels. The number of subchannel is typically small, e.g., 1-27 subchannels, so that blind decoding all subchannels still feasible. In some designs, PSSCH can occupy up to $N_{subchannel}^{SL}$ contiguous subchannels. In some designs, PSCCH can occupy up to one subchannel with the lowest subchannel index. In some designs, a $1^{st}$ stage SCI is transmitted in PSCCH containing information about PSSCH bandwidth and resource reservations in future slots. In some designs, a $2^{nd}$ stage SCI can be found and decoded after decoding PSCCH, source ID and destination ID are used to distinguish whether the packet is for the UE and coming from which UE. In some designs, the subchannel size in V2X may be large, e.g., minimum 10 RBs. In some designs, cellular (C-V2X) intends the UEs to decode all transmissions and requires blind decoding of all subchannels.

Figure 6A:
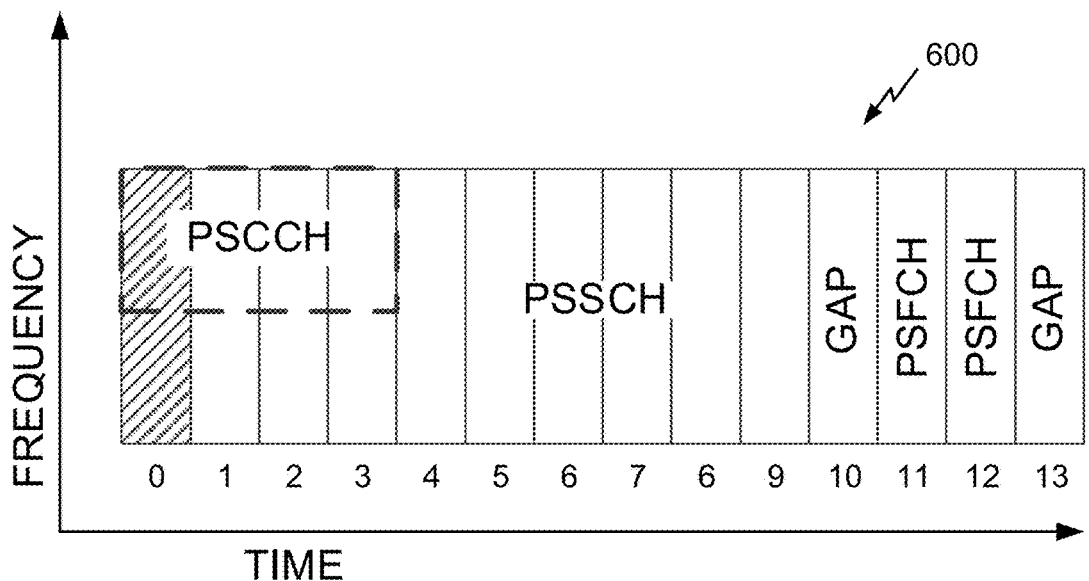
FIG. 6A illustrates one example of a TDD sidelink (PC5) resource configuration in accordance with an aspect of the disclosure.

FIG. 6A illustrates one example of a TDD sidelink (PC5) resource configuration 600 in accordance with an aspect of the disclosure. The TDD sidelink (PC5) resource configuration 600 includes 14 OFDM symbols denoted as symbols 0 through 13. In the TDD sidelink (PC5) resource configuration 600 of FIG. 6A, PSCCH is allocated to symbols 0-3 (e.g., in a first bandwidth), PSSCH is allocated to symbols 0-3 (e.g., in a second bandwidth) and to symbols 4-9, a gap is defined in symbol 10, PSFCH is allocated to symbols 11-12, and a gap is defined in symbol 13. The TDD sidelink (PC5) resource configuration 600 is only one example resource configuration, and other configurations are possible in other aspects.

Referring to FIG. 6A, with respect to SCI 1_0 in PSCCH, a frequency domain resource allocation (FDRA) may be configured with $$\left\lceil \log \frac{N_{subchannel}^{SL}(N_{subchannel}^{SL}+1)}{2} \right\rceil$$

bits for 2 reservations, or $$\left\lceil \log \frac{N_{subchannel}^{SL}(N_{subchannel}^{SL}+1)(2N_{subchannel}^{SL}+1)}{6} \right\rceil$$

bits for 3 reservations, and a time domain resource allocation (TDRA) may be configured with 5 bits for 2 reservations or 9 bits for 3 reservations.

Figure 6B:
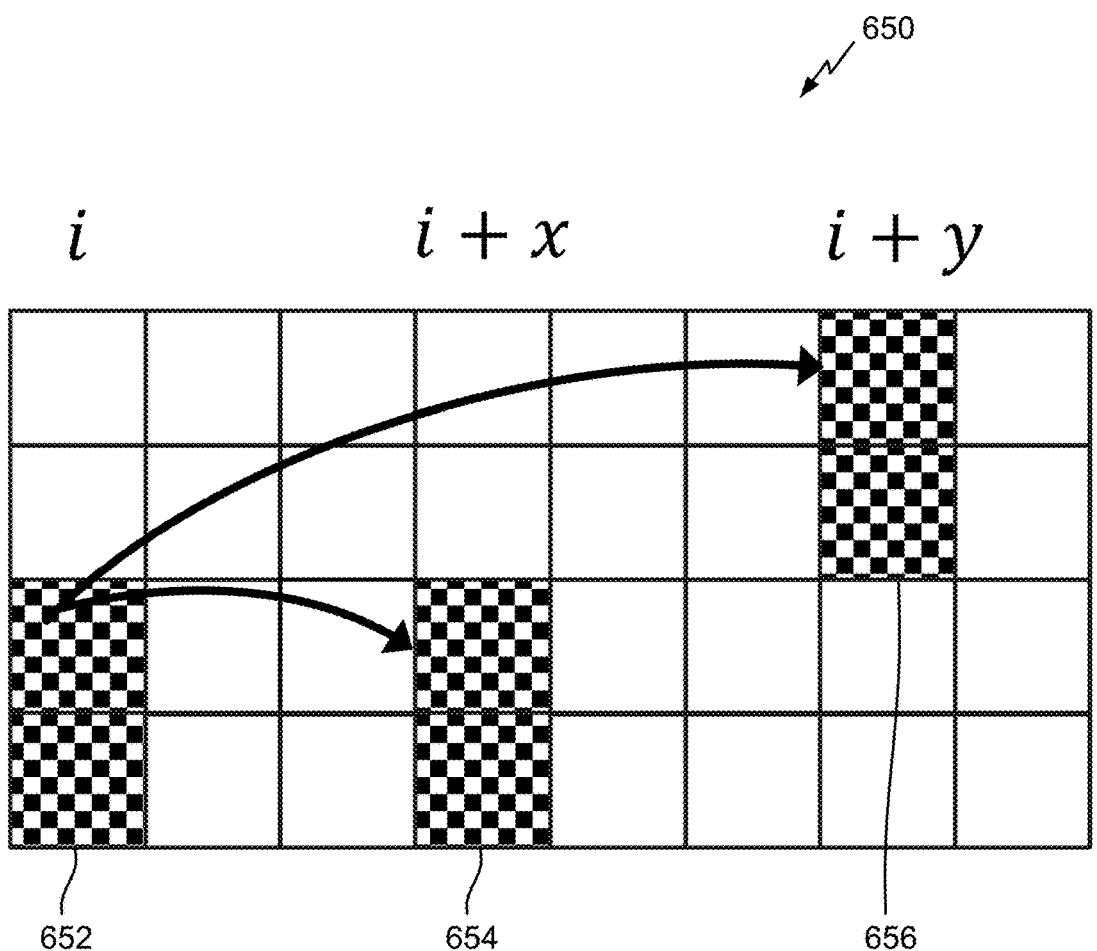
FIG. 6B illustrates an SCI-based resource reservation scheme in accordance with an aspect of the disclosure.

FIG. 6B illustrates an SCI-based resource reservation scheme 650 in accordance with an aspect of the disclosure. In FIG. 6B, a first reservation 652 is defined at slot i, a second reservation 654 is offset from slot i by x slots (slot i+x) where 0<x≤31, and a third reservation 656 is offset from slot I by y slots (slot i+y) where x<y≤31.

Referring to FIGS. 6A-6B, in some designs, PSCCH is (pre)configured to occupy {10, 12, 15, 20, 25} PRBs, limited to a single sub-channel. In some designs, PSCCH duration is (pre)configured to 2 or 3 symbols. In some designs, a sub-channel can occupy {10, 15, 20, 25, 50, 75, 100} PRBs. In some designs, a number of subchannels can be 1-27 in a resource pool (RP). In some designs, PSCCH size is fixed for a resource pool (e.g., PSCCCH size may occupy 10% to 100% of one subchannel (first 2 or 3 symbols), depending on configuration). In some designs, PSSCH occupies at least 1 subchannel and contains $2^{nd}$ stage SCI.

Figure 7:
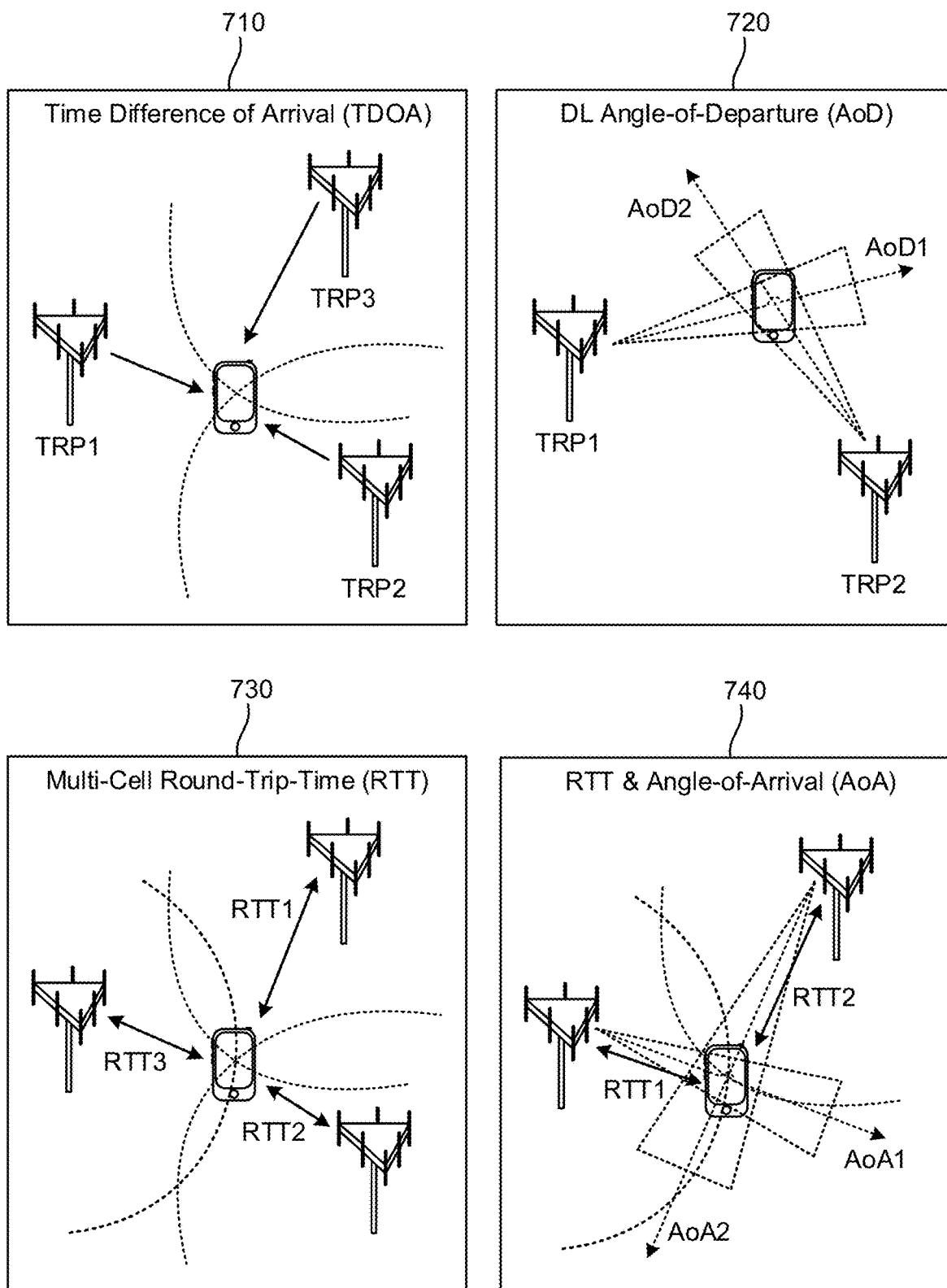
FIG. 7 illustrates examples of various positioning methods, according to aspects of the disclosure.

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. FIG. 7 illustrates examples of various positioning methods, according to aspects of the disclosure. In an OTDOA or DL-TDOA positioning procedure, illustrated by scenario 710, a UE measures the differences between the times of arrival (ToAs) of reference signals (e.g., positioning reference signals (PRS)) received from pairs of base stations, referred to as reference signal time difference (RSTD) or time difference of arrival (TDOA) measurements, and reports them to a positioning entity. More specifically, the UE receives the identifiers (IDs) of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity can estimate the UE's location.

For DL-AoD positioning, illustrated by scenario 720, the positioning entity uses a beam report from the UE of received signal strength measurements of multiple downlink transmit beams to determine the angle(s) between the UE and the transmitting base station(s). The positioning entity can then estimate the location of the UE based on the determined angle(s) and the known location(s) of the transmitting base station(s).

Uplink-based positioning methods include uplink time difference of arrival (UL-TDOA) and uplink angle-of-arrival (UL-AoA). UL-TDOA is similar to DL-TDOA, but is based on uplink reference signals (e.g., sounding reference signals (SRS)) transmitted by the UE. For UL-AoA positioning, one or more base stations measure the received signal strength of one or more uplink reference signals (e.g., SRS) received from a UE on one or more uplink receive beams. The positioning entity uses the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods include enhanced cell-ID (E-CID) positioning and multi-round-trip-time (RTT) positioning (also referred to as "multi-cell RTT"). In an RTT procedure, an initiator (a base station or a UE) transmits an RTT measurement signal (e.g., a PRS or SRS) to a responder (a UE or base station), which transmits an RTT response signal (e.g., an SRS or PRS) back to the initiator. The RTT response signal includes the difference between the ToA of the RTT measurement signal and the transmission time of the RTT response signal, referred to as the reception-to-transmission (Rx-Tx) time difference. The initiator calculates the difference between the transmission time of the RTT measurement signal and the ToA of the RTT response signal, referred to as the transmission-to-reception (Tx-Rx) time difference. The propagation time (also referred to as the "time of flight") between the initiator and the responder can be calculated from the Tx-Rx and Rx-Tx time differences. Based on the propagation time and the known speed of light, the distance between the initiator and the responder can be determined. For multi-RTT positioning, illustrated by scenario 730, a UE performs an RTT procedure with multiple base stations to enable its location to be determined (e.g., using multilateration) based on the known locations of the base stations. RTT and multi-RTT methods can be combined with other positioning techniques, such as UL-AoA, illustrated by scenario 740, and DL-AoD, to improve location accuracy.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base station(s).

To assist positioning operations, a location server (e.g., location server 230, LMF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive positioning subframes, periodicity of positioning subframes, muting sequence, frequency hopping sequence, reference signal identifier, reference signal bandwidth, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds (μs). In some cases, when any of the resources used for the positioning measurement are in FR1, the value range for the uncertainty of the expected RSTD may be +/−32 μs. In other cases, when all of the resources used for the positioning measurement(s) are in FR2, the value range for the uncertainty of the expected RSTD may be +/−8 μs.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Figure 8:
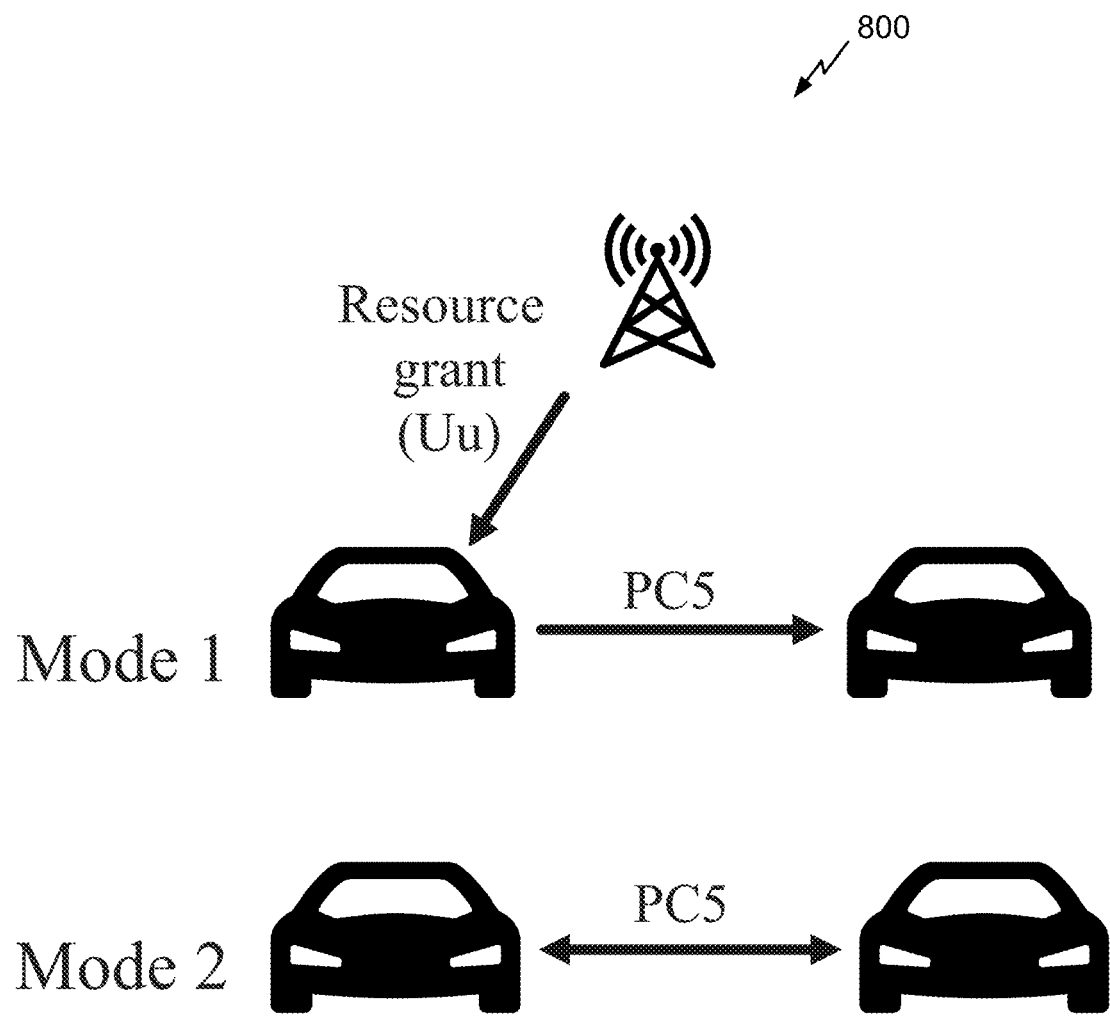
FIG. 8 illustrates sidelink communication scheduling (or resource allocation) schemes in accordance with aspects of the disclosure.

FIG. 8 illustrates sidelink communication scheduling (or resource allocation) schemes 800 in accordance with aspects of the disclosure. In some designs, resource allocation in V2X may be implemented via Mode 1, where gNB assigns Tx resources for sidelink communications through DCI 3_0. In other designs, resource allocation in V2X may be implemented via Mode 2, where a transmitting UE autonomously decides resources for sidelink communications. In some designs, the receiving UE behavior is the same for both Modes 1 and 2.

Referring to FIG. 8, Mode 1 supports dynamic grants (DG), configured grants (CG) type 1, and CG type 2. In some designs, CG type 1 is activated via RRC signaling from gNB. DCI 3_0 is transmitted by gNB to allocation time and frequency resources and indicates transmission timing. In some designs, the modulation and coding scheme (MCS) MCS is up to UE within limit set by gNB. In Mode 2, the transmitting UE performs channel sensing by blindly decoding all PSCCH channels and finds out reserved resources by other sidelink transmissions. The transmitting UE reports available resources to upper layer and upper layer decides resource usage.

In some designs, in industrial IoT (IIoT), sidelink can enable direct programmable logical controller (PLC) and sensors/actuators (SAs) communications. Wireless PLC is desired for flexible and simple deployment. In some designs, each PLC controls 20-50 SAs. In some designs, IIoT has low latency 1-2 ms and ultra-reliability requirement $10^{-6}$ error rate. In some designs, communication through gNB would require multiple OTAs, affecting latency and reliability.

IIoT traffics are typically deterministic and with small packet size 32-256 bytes. The required bandwidth is thus low, e.g., 2 RBs might be sufficient for some cases. SAs may have constraint on UE capability in terms of bandwidth and processing power. Overall bandwidth may be large for IIoT with dedicated frequency bands and/or unlicensed bands. In some designs, SAs need not detect/monitor all transmissions. In some designs, PSCCH has to meet stringent IIoT requirement. IIoT networks may also be associated with challenging RF environments due to blockage and interference.

As noted above, a $1^{st}$ stage SCI may be included in PSCCH. The $1^{st}$ stage SCI may alternatively be referred to as SCI 1-A. In some designs, SCI 1-A shall be decoded by intended RXs and other sidelink UEs (particularly in Mode 2) to allow channel sensing and avoid resource collision. In some designs, SCI 1-A may be configured as follows:
  Priority 3 bits
  Frequency resource assignment, bits depending on # of slot reservations and # subchannels
  Time resource assignment, 5 or 9 bits for 2 or 3 reservations
  Resource reservation period, bits depending on # allowed periods
  DM-RS pattern, bits depending on # configured patterns
  SCI 2 format, 2 bits
  Beta offset for SCI 2 rate matching, 2 bits
  DM-RS port, 1 bit indicating one or two data layers
  MCS, 5 bits
  Additional MCS table, 0-2 bits
  PSFCH overhead indicator, 0 or 1 bit
  Reserved bits, bits up to upper layer As noted above, a $2^{nd}$ stage SCI may be included in PSSCH. The $2^{nd}$ stage SCI may alternatively be referred to as SCI 2. In some designs, SCI 2 is intended to help receiving UEs decode the PSSCH. In some designs, SCI 2 may be configured as follows:
  HARQ ID, bits depending on # HARQ process
  NDI, 1 bit
  RV-ID, 2 bits
  Source ID, 8 bits
  Dest. ID, 16 bits
  HARQ enable/disable, 1 bit
  SCI 2-A only fields: Cast type, 2 bits, broadcast, groupcast, unicast; CSI request, 1 bit
  SCI 2-B only fields (NACK-only groupcast): Zone ID, 12 bits; Communication range, 4 bits In addition to the downlink-based, uplink-based, and downlink-and-uplink-based positioning methods, NR supports various sidelink positioning techniques. For example, link-level ranging signals can be used to estimate the distance between pairs of V-UEs or between a V-UE and a roadside unit (RSU), similar to a round-trip-time (RTT) positioning procedure.

Figure 9:
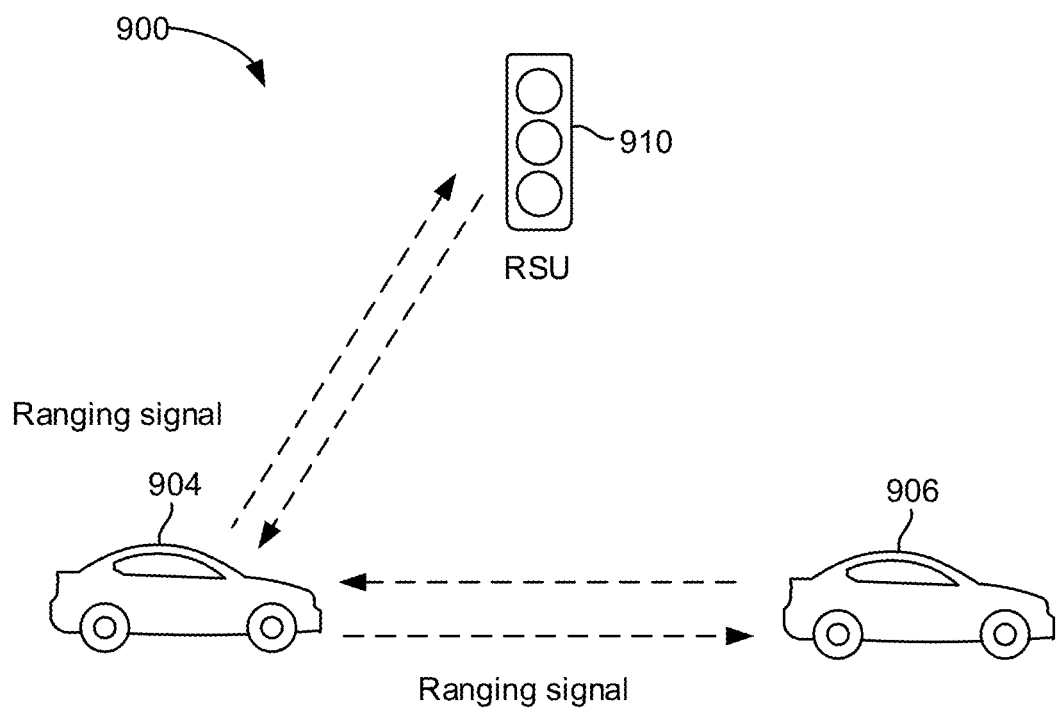
FIG. 9 illustrates an example wireless communication system in which a vehicle user equipment (V-UE) is exchanging ranging signals with a roadside unit (RSU) and another V-UE, according to aspects of the disclosure.

FIG. 9 illustrates an example wireless communication system 900 in which a V-UE 904 is exchanging ranging signals with an RSU 910 and another V-UE 906, according to aspects of the disclosure. As illustrated in FIG. 9, a wideband (e.g., FR1) ranging signal (e.g., a Zadoff Chu sequence) is transmitted by both end points (e.g., V-UE 904 and RSU 910 and V-UE 904 and V-UE 906). In an aspect, the ranging signals may be sidelink positioning reference signals (SL-PRS) transmitted by the involved V-UEs 904 and 906 on uplink resources. On receiving a ranging signal from a transmitter (e.g., V-UE 904), the receiver (e.g., RSU 910 and/or V-UE 906) responds by sending a ranging signal that includes a measurement of the difference between the reception time of the ranging signal and the transmission time of the response ranging signal, referred to as the reception-to-transmission (Rx-Tx) time difference measurement of the receiver.

Upon receiving the response ranging signal, the transmitter (or other positioning entity) can calculate the RTT between the transmitter and the receiver based on the receiver's Rx-Tx time difference measurement and a measurement of the difference between the transmission time of the first ranging signal and the reception time of the response ranging signal (referred to as the transmission-to-reception (Tx-Rx) time difference measurement of the transmitter). The transmitter (or other positioning entity) uses the RTT and the speed of light to estimate the distance between the transmitter and the receiver. If one or both of the transmitter and receiver are capable of beamforming, the angle between the V-UEs 904 and 906 may also be able to be determined. In addition, if the receiver provides its global positioning system (GPS) location in the response ranging signal, the transmitter (or other positioning entity) may be able to determine an absolute location of the transmitter, as opposed to a relative location of the transmitter with respect to the receiver.

As will be appreciated, ranging accuracy improves with the bandwidth of the ranging signals. Specifically, a higher bandwidth can better separate the different multipaths of the ranging signals.

Note that this positioning procedure assumes that the involved V-UEs are time-synchronized (i.e., their system frame time is the same as, or has a known offset relative to, the other V-UE(s)). In addition, although FIG. 9 illustrates two V-UEs, as will be appreciated, they need not be V-UEs, and may instead be any other type of UE capable of sidelink communication.

Figure 10:
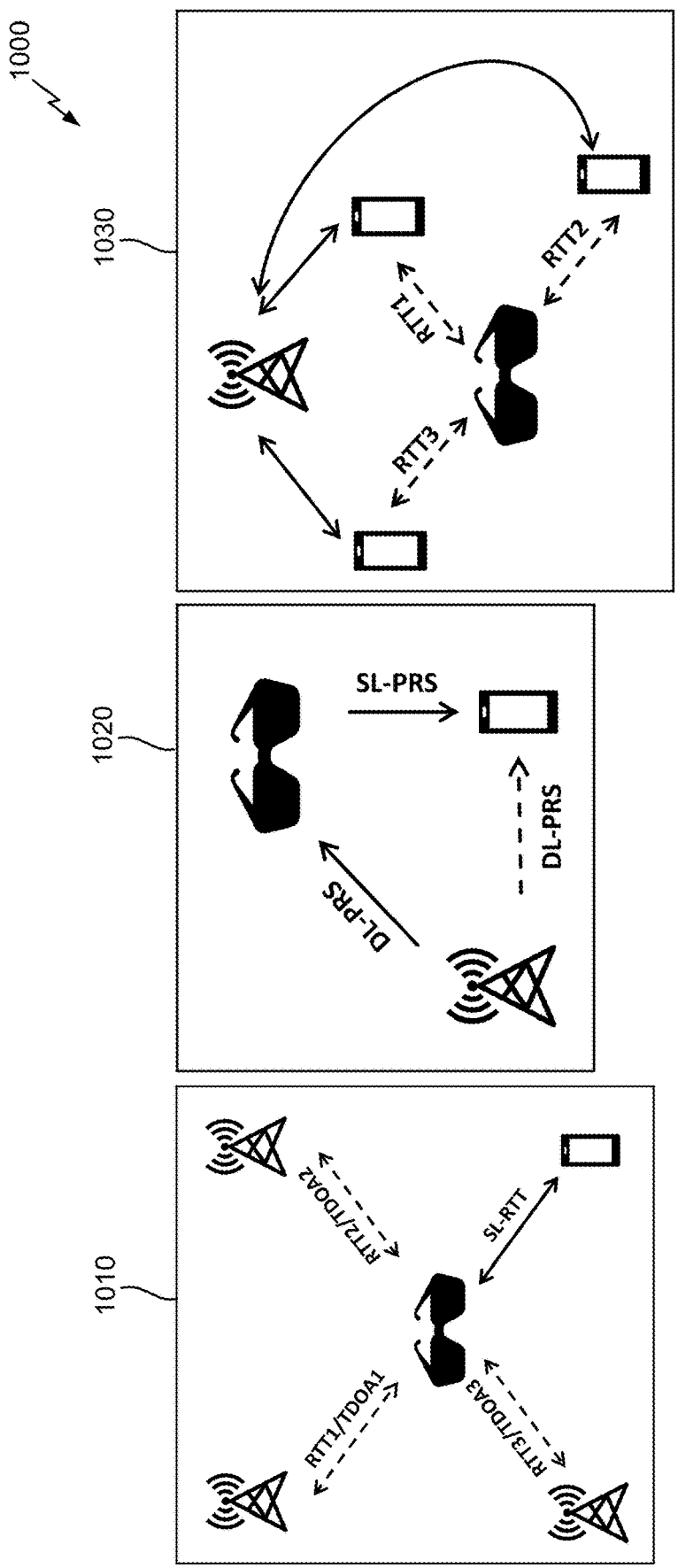
FIG. 10 illustrates other sidelink positioning schemes in accordance with aspects of the disclosure.

FIG. 10 illustrates other sidelink positioning schemes 1000 in accordance with aspects of the disclosure. In FIG. 10, each positioning scheme involves a target UE (in this case, a VR headset), at least one gNB, and at least one reference UE (e.g., a UE with a known location from a recent positioning fix, where such a location generally has a lower variance than a typical error estimate for UE position).

Referring to FIG. 10, scenario 1010 depicts a UE with a known location improving Uu positioning (e.g., RTT-based or TDOA-based) by providing an extra anchor. Scenario 1020 depicts positioning for a low-tier UE (e.g., VR headset) via the help from premium UEs (i.e., SL-only based positioning/ranging). Scenario 1030 depicts a relay or reference UE (with known location) participating in position estimation for a remote UE (e.g., VR headset) without UL PRS transmission in Uu. Each of the scenarios 1010-1030 may be broadly characterized as an SL-assisted positioning scheme.

The SL UEs that are assisting in position estimation of a target UE can impact various aspects associated with SL-assisted positioning, such as power consumption and/or position estimation accuracy.

Figure 11:
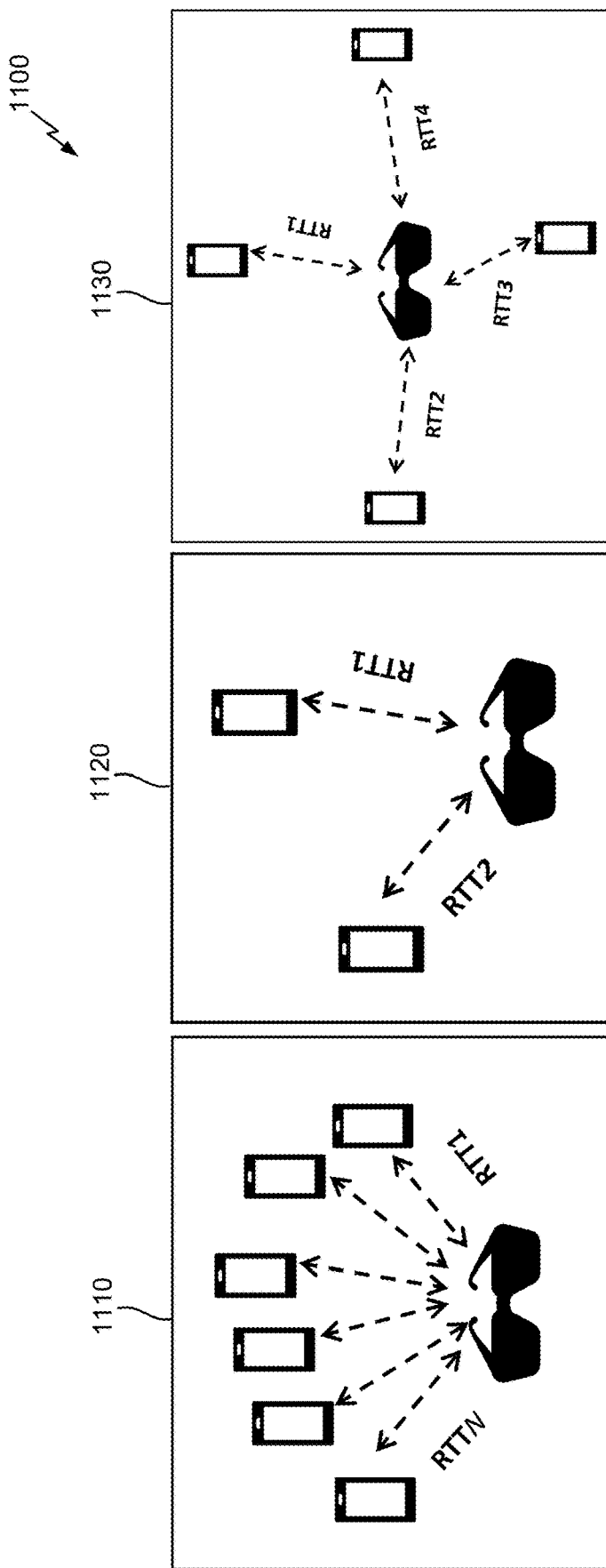
FIG. 11 illustrates other UE distribution scenarios for sidelink positioning in accordance with aspects of the disclosure.

FIG. 11 illustrates other UE distribution scenarios 1100 for sidelink positioning in accordance with aspects of the disclosure. In UE distribution scenario 1110, a high number of UEs participate in SL-assisted positioning, which is good for position estimation accuracy but also greatly increases power consumption. In UE distribution scenario 1120, only two UEs participate in SL-assisted positioning, which is good for power consumption but also reduces position estimation accuracy. In UE distribution scenario 1130, there is a reasonable number (i.e., 4) UEs participating in SL-assisted positioning, so the power consumption is not too high and the UEs are also well spaced apart with a sufficient number for good position estimation accuracy.

Aspects of the disclosure are directed to selection of UEs for participation in a sidelink-assisted position estimation procedure of a target UE based at least in part upon zone information associated with a group of candidate UEs. Such aspects may provide various technical advantages, such as improved position estimation accuracy and/or lower power consumption (e.g., across the various UEs involved with the sidelink-assisted position estimation procedure) by spreading the distribution of participating UEs across zones.

Figure 12:
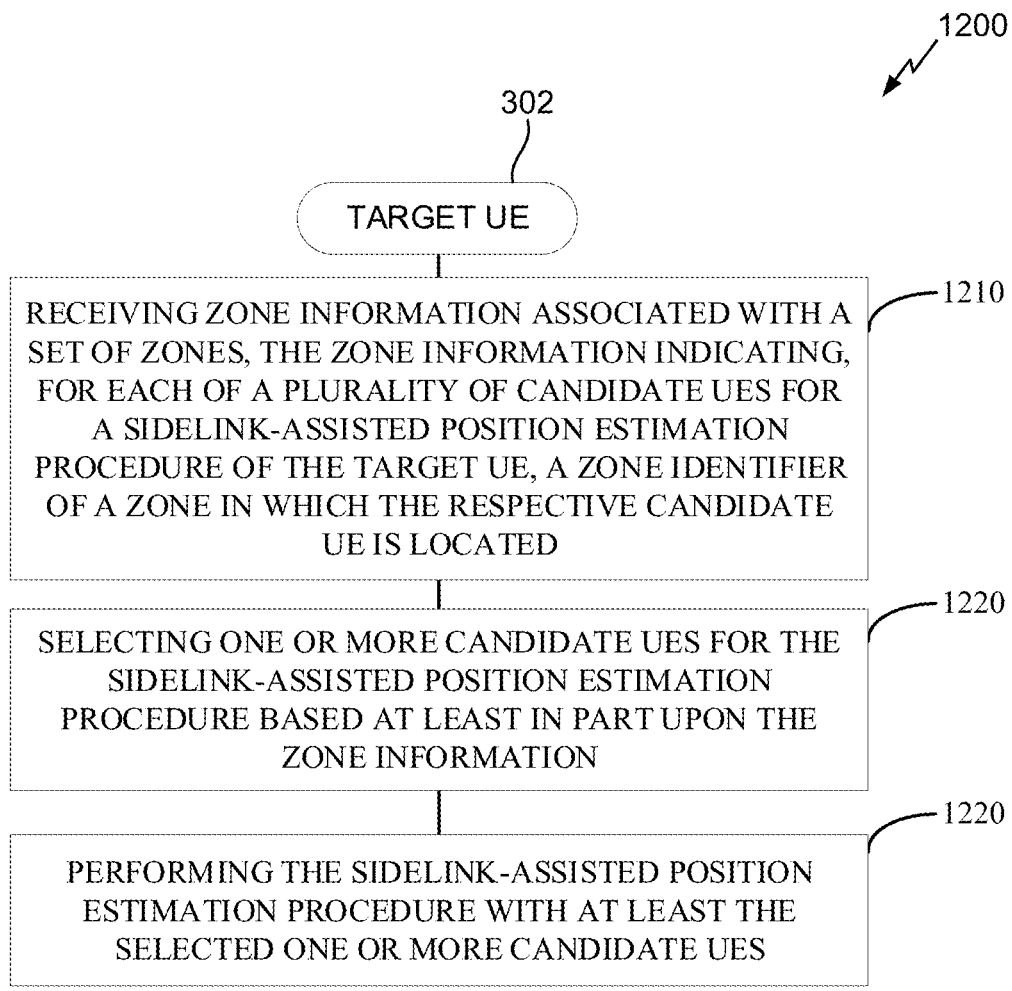
FIG. 12 illustrates an exemplary process 1200 of wireless communication, according to aspects of the disclosure.

FIG. 12 illustrates an exemplary process 1200 of wireless communication, according to aspects of the disclosure. In an aspect, the process 1200 may be performed by a target UE (e.g., a UE for which position estimation is desired), such as UE 302.

Referring to FIG. 12, at 1210, the target UE (e.g., receiver 312 or 322, etc.) receives zone information associated with a set of zones, the zone information indicating, for each of a plurality of candidate UEs for a sidelink-assisted position estimation procedure of the target UE, a zone identifier of a zone in which the respective candidate UE is located. In some designs, the set of zones may include a plurality of zones (e.g., in scenario where candidate UEs are dispersed across two or more zones). In other designs, the set of zones may include a single zone (e.g., in scenario where candidate UEs are clustered in the same zone). In some designs, the zone information for some or all of the plurality of candidate UEs is broadcasted by the respective candidate UE (e.g., in which case, the zone information for a particular candidate UE is received directly from that particular candidate UE). In some designs, the broadcasted zone information is transmitted via SCI of a PSCCH (e.g., a $1^{st}$ stage SCI, such as SCI 1-A). In other designs, the zone information for some or all of the plurality of candidate UEs is received indirectly from a different respective UE (e.g., via a relaying or forwarding scheme across a mesh network of UEs) or from a base station (e.g., gNB accumulates zone information for various UEs and then broadcasts the zone information associated with nearby zones). The zone information may include a variety of information, as will be described below in more detail. In some designs, a means for performing the reception of the zone information at 1210 may include receiver 312 or 322 of UE 302.

Referring to FIG. 12, at 1220, the target UE (e.g., processor(s) 332, UE selection component 384, etc.) selects one or more candidate UEs for the sidelink-assisted position estimation procedure based at least in part upon the zone information. In some designs, the selection of 1220 may be based upon one or more zone-based rules, as will be described below in more detail. In some designs, a means for performing the selection of the zone candidate UE(s) at 1220 may include processor(s) 332, UE selection component 384, etc. of UE 302.

Referring to FIG. 12, at 1230, the target UE (e.g., processor(s) 332, transmitter 314 or 314, receiver 312 or 322, etc.) performs the sidelink-assisted position estimation procedure with at least the selected one or more candidate UEs. The sidelink-assisted position estimation procedure can be performed in various ways (e.g., RTT, multi-RTT or differential RTT or double-differential RTT, TDOA-based, etc.). In some designs, each reference node associated with the sidelink-assisted position estimation procedures corresponds to the selected one or more candidate UEs (e.g., as in SL-only RTT scheme 1030 as one example). In other designs, at least one reference node associated with the sidelink-assisted position estimation procedures corresponds to a base station (e.g., a hybrid sidelink/gNB positioning scheme, such as 1010 or 1020 of FIG. 10, etc.). In some designs, a means for performing the sidelink-assisted position estimation procedure at 1230 may include processor(s) 332, transmitter 314 or 314, receiver 312 or 322, etc. of UE 302, dependent on whether the target UE is transmitting SRS and/or measuring PRS and/or deriving Tx->Rx measurement, or whether the target UE is the position estimation entity (e.g., UE-based position estimation) or whether another UE or a network component (e.g., LMF) is the position estimation entity).

Referring to FIG. 12, in some designs, the zone information further includes an indication of accuracy for at least one zone identifier indications, and the selection at 1220 is further based on the indication of accuracy. In some designs, the indication of accuracy is indicated implicitly by the zone identifier (e.g., a zone ID associated with a known high-interference area may be, by default, associated with a low accuracy level). In other designs, the indication of accuracy is included in SCI of PSCCH (e.g., SCI 1-A) or PSSCH (e.g., SCI 2). In this case, the indication of accuracy may be based on dynamic conditions (e.g., if candidate UE is very close to boundary to another zone and/or is on a trajectory towards another zone, then the candidate UE may indicate low accuracy to indicate a looser associated with the indicated zone, etc.).

Referring to FIG. 12, in some designs, a mapping of zone identifiers to zones or instructions on how to derive the mapping are pre-defined, pre-configured (e.g., via RRC or SIB), or received at the target UE from an external entity (e.g., via gNB or another UE). In some designs, the zone identifiers and their associated zones may be applicationdriven, or based on group communication services (GCS) protocol or location services (LCS) protocol. For example, for an indoor factory, a zone ID may be associated with a particular hallway, etc. In some designs, zone identifier and associated zone computation may be implemented at the application-layer (e.g., derived independently at each UE, etc.). For example, the zone identifier may be computed algorithmically based on of one or more rules to permit independent generation or derivation (e.g., zone ID may be defined in terms of an offset to a pre-defined reference coordinate or origin with pre-defined zone size such that a coarse estimate of the UE may indicate a respective, from which the zone identifier that characterizes the respective zone can be assembled, etc.).

Referring to FIG. 12, in some designs, the selection is based upon one or more zone-based rules. In some designs, the one or more zone-based rules include:

excluding, from selection, any candidate UE within a first threshold distance to the target UE, or excluding, from selection, any candidate UE in the same zone as the target UE, or excluding, from selection, any candidate UE that exceeds a second threshold distance to the target UE, or excluding, from selection, any candidate UE in any zone that exceeds a third threshold distance to respective zone of the target UE, or limiting selection of candidate UEs in the same zone to less than a first threshold number, or limiting selection of candidate UEs in an adjacent zone to the respective zone of the target UE to less than a second threshold number, or a combination thereof.

In some designs, some or all of the above-noted rules may be implemented selectively based on various criteria. For example, if the sidelink-assisted position estimation procedure is based on timing measurements, then the exclusion of candidate UEs that are too close to the target UE may be implemented (e.g., inside same zone or within first threshold distance). However, these nearby candidate UEs may be helpful for other types of position estimation that rely on angle-based measurements (e.g., AoD or AoA). In this case, the proximity exclusion can be implemented selectively based on the type of positioning scheme (e.g., timing-based or angle-based).

Referring to FIG. 12, in some designs, the target UE may further determine a RSRP of at least one signal from at least one of the plurality of candidate UEs, the selection at 1220 is further based on the RSRP determination (e.g., so zone information is considered, while RSRP is also considered). Hence, the selection at 1220 need not be based solely on the zone information.

Referring to FIG. 12, in some designs, the target UE may further determine a line of sight (LOS) or non-LOS (NLOS) confidence level associated with at least one link to at least one of the plurality of candidate UEs, and the selection at 1220 is further based on the LOS or NLOS confidence level determination (e.g., so zone information is considered, while LOS/NLOS condition is also considered). For example, candidate UEs with LOS links to the target UE may generally be preferable for selection over candidate UEs with NLOS links to the target UE. Hence, the selection at 1220 need not be based solely on the zone information.

Referring to FIG. 12, as noted above, the sidelink-assisted position estimation procedure may include a timing measurement procedure (e.g., RTT or multi-RTT or differential RTT or double-differential RTT or TDOA, etc.), an angle measurement procedure (e.g., AoA or AoD, etc.), or a combination thereof.

Figure 13:
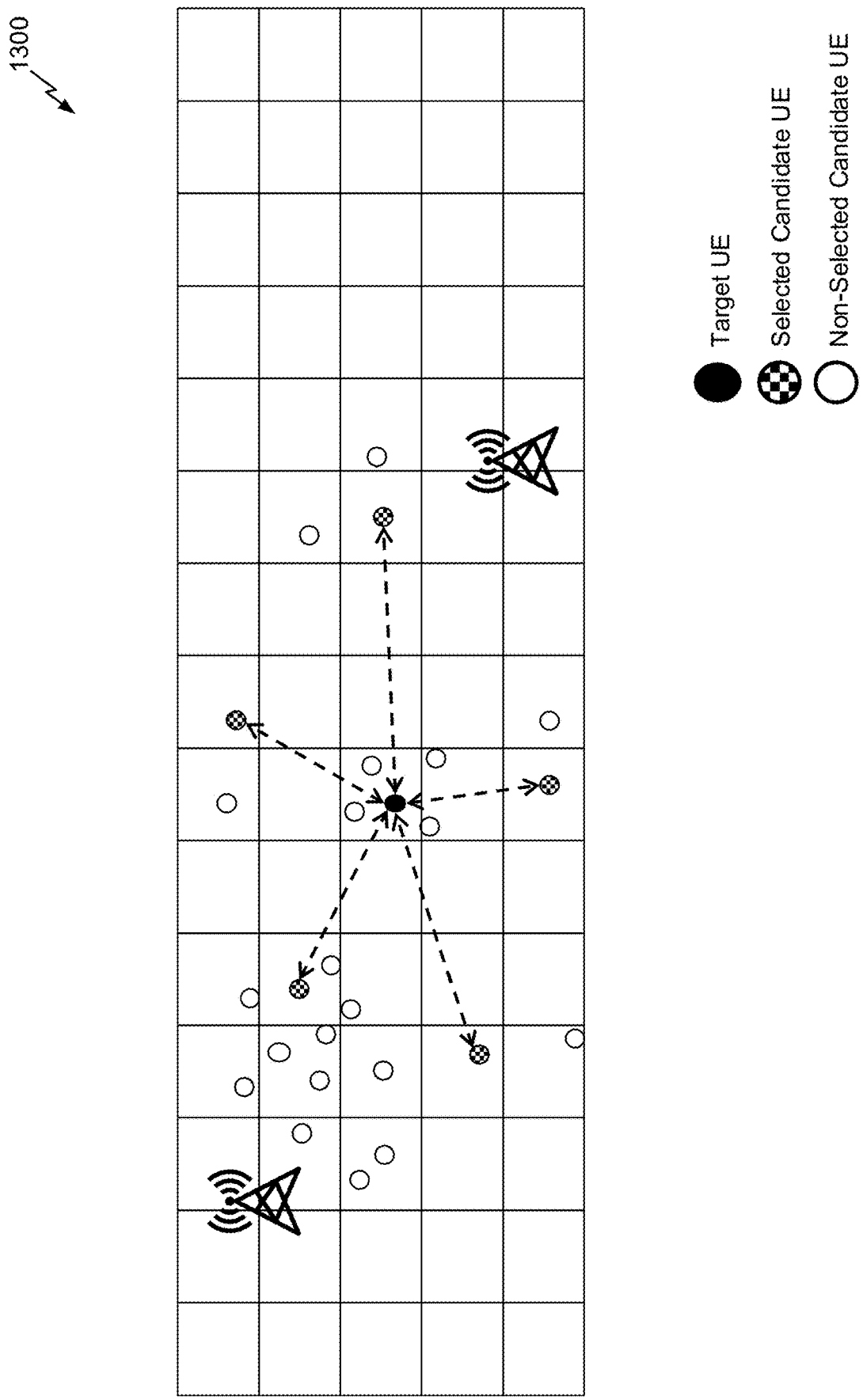
FIGS. 13-16 illustrate example implementations of the process of FIG. 12 in accordance with aspects of the disclosure.

FIG. 13 illustrates an example implementation 1300 of the process 1200 of FIG. 12 in accordance with an aspect of the disclosure. In FIG. 13, a grid is depicted whereby each box of the grid corresponds to a particular zone associated with a respective zone identifier. Circles are depicted in the grid which are marked to indicate the target UE, the selected candidate UEs, and the non-selected candidate UEs. As shown in FIG. 13, the selected candidate UEs are spaced apart in terms of zones and are angularly spaced apart as well to obtain a reasonable spatial distribution of UEs for the sidelink-assisted position estimation procedure.

Figure 14:
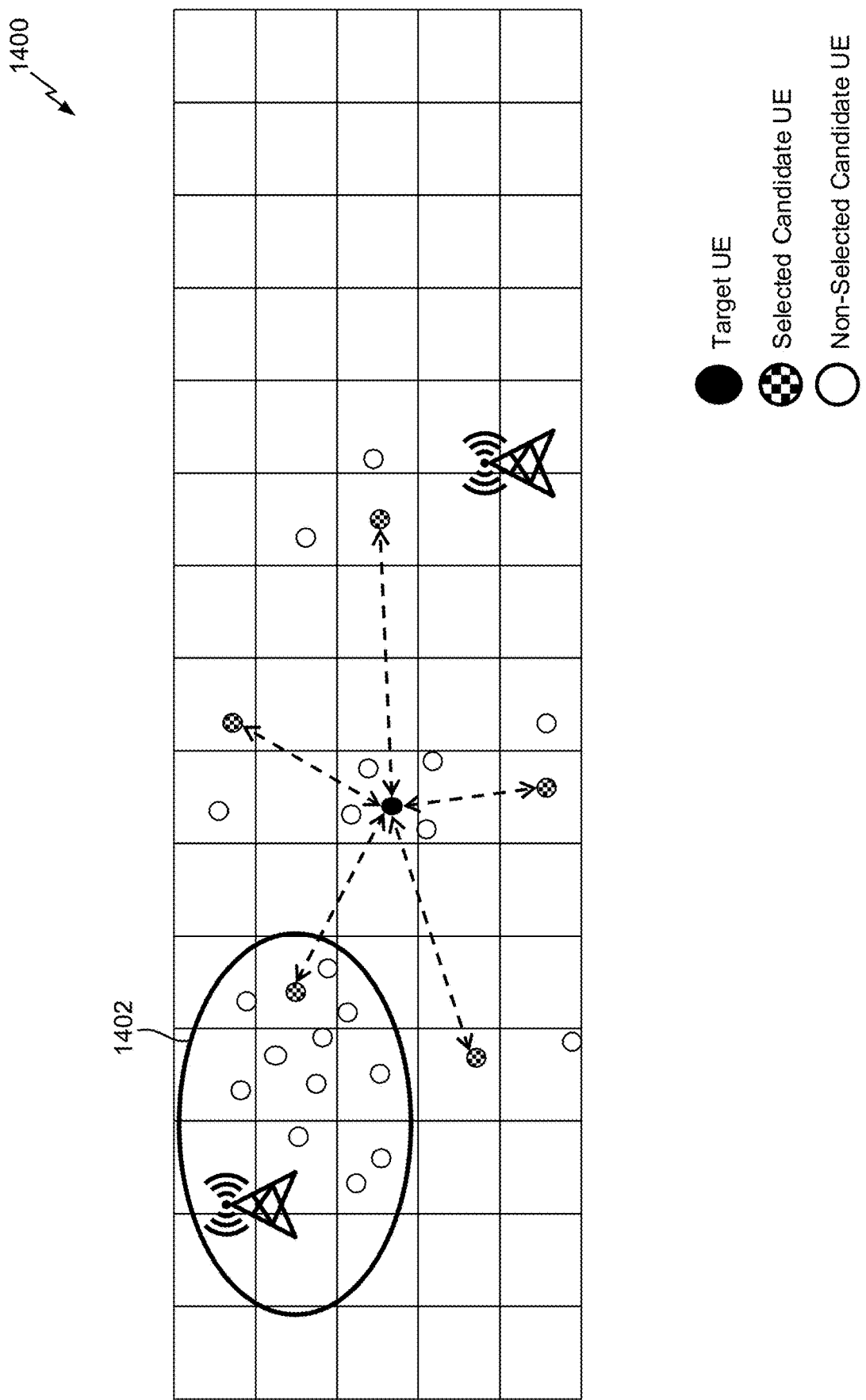

FIG. 14 illustrates an example implementation 1400 of the process 1200 of FIG. 12 in accordance with an aspect of the disclosure. FIG. 14 is similar to FIG. 13, except that a candidate UE cluster is depicted at 1402 with a high number of nearby zone co-located UEs. In some designs, assisting UE in same/similar location (e.g., as in the candidate UE cluster 1402) may provide limited gain (e.g., hence the rationale to space apart the selected candidate UEs). In some designs, one or few assisting UE from same or adjacent zones may be sufficient for the sidelink-assisted position estimation procedure. In some designs, in a scenario where there are multiple candidate UEs available for selection, RSRP may be considered as a secondary factor (as described above), e.g., based on based RSRP from SCI-1/SCI-2 and PSSCH. In some designs, as noted above, "POS-Accuracy" information of candidate UEs may be considered by the target UE, including sync error info. In some designs, as noted above, the selection at 1220 may further based on expectation (or confidence level) of LOS/NLOS (e.g., derivable from DMRS or other assistance information).

Figure 15:
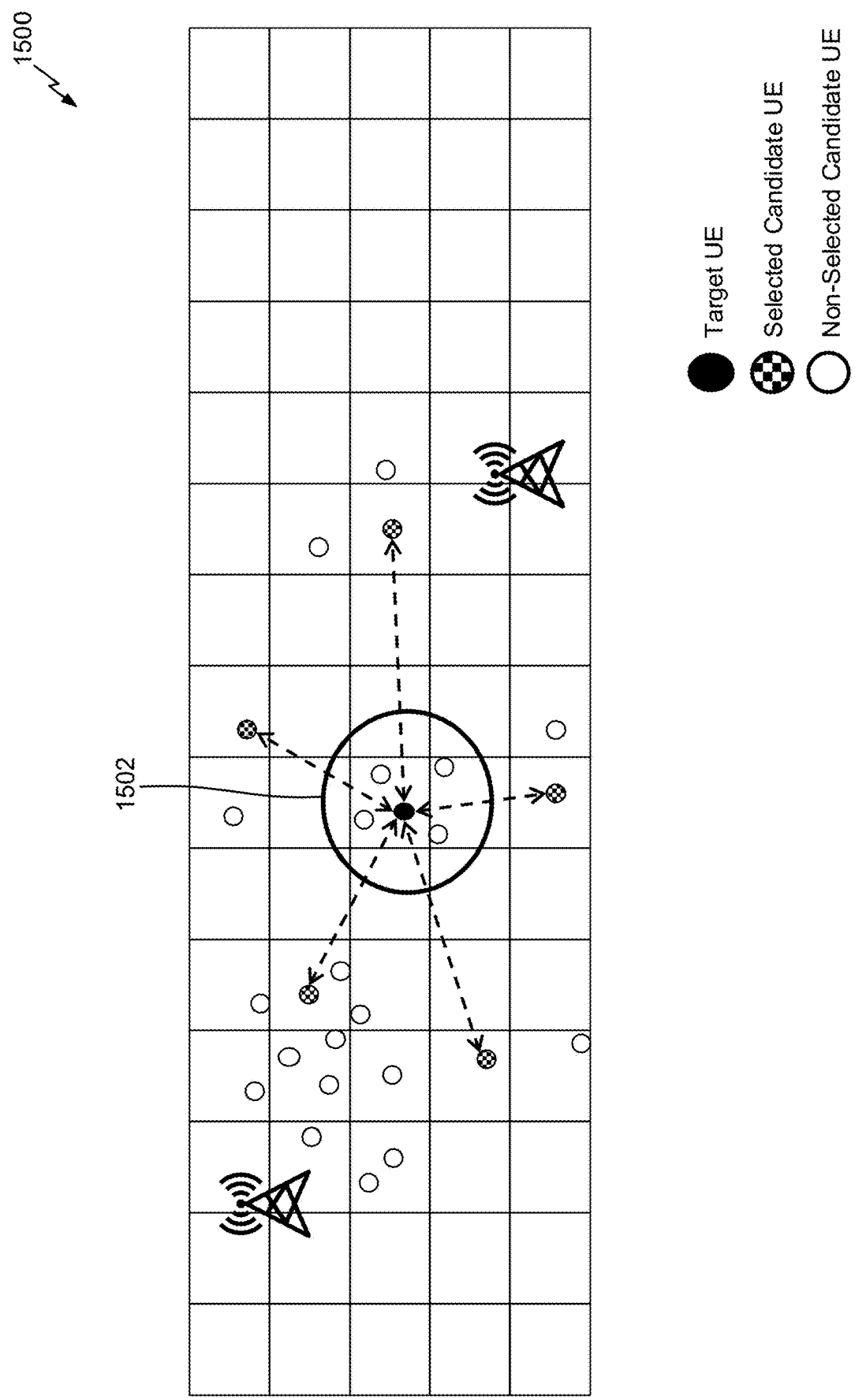

FIG. 15 illustrates an example implementation 1500 of the process 1200 of FIG. 12 in accordance with an aspect of the disclosure. FIG. 15 is similar to FIG. 13, except that an proximity-based exclusion area is depicted at 1502. In some designs, ToA for PRS between close-by UEs may be sub 10 ns. In some designs, PRS and hardware bandwidth may not "resolve" ToA below a threshold. For example, a resolvable time between samples may be 1/SamplingFreq, or 3 m for 100 Mhz sampling rate. In some designs, sync error and other bias may cause error above a distance between UEs. In some designs, for timing-based positioning schemes, nearby UEs may only useful if close-by UE has very good POS accuracy. In some designs, for nearby UEs, sharing POS-info via SL may be better than receiving PRS (e.g., instead of measuring PRS, simply identify a nearby UE location to gain knowledge that the target UE is very close to that location). As noted above, nearby UEs may be useful for other types of position estimation schemes, such as angle-based position estimation schemes.

Figure 16:
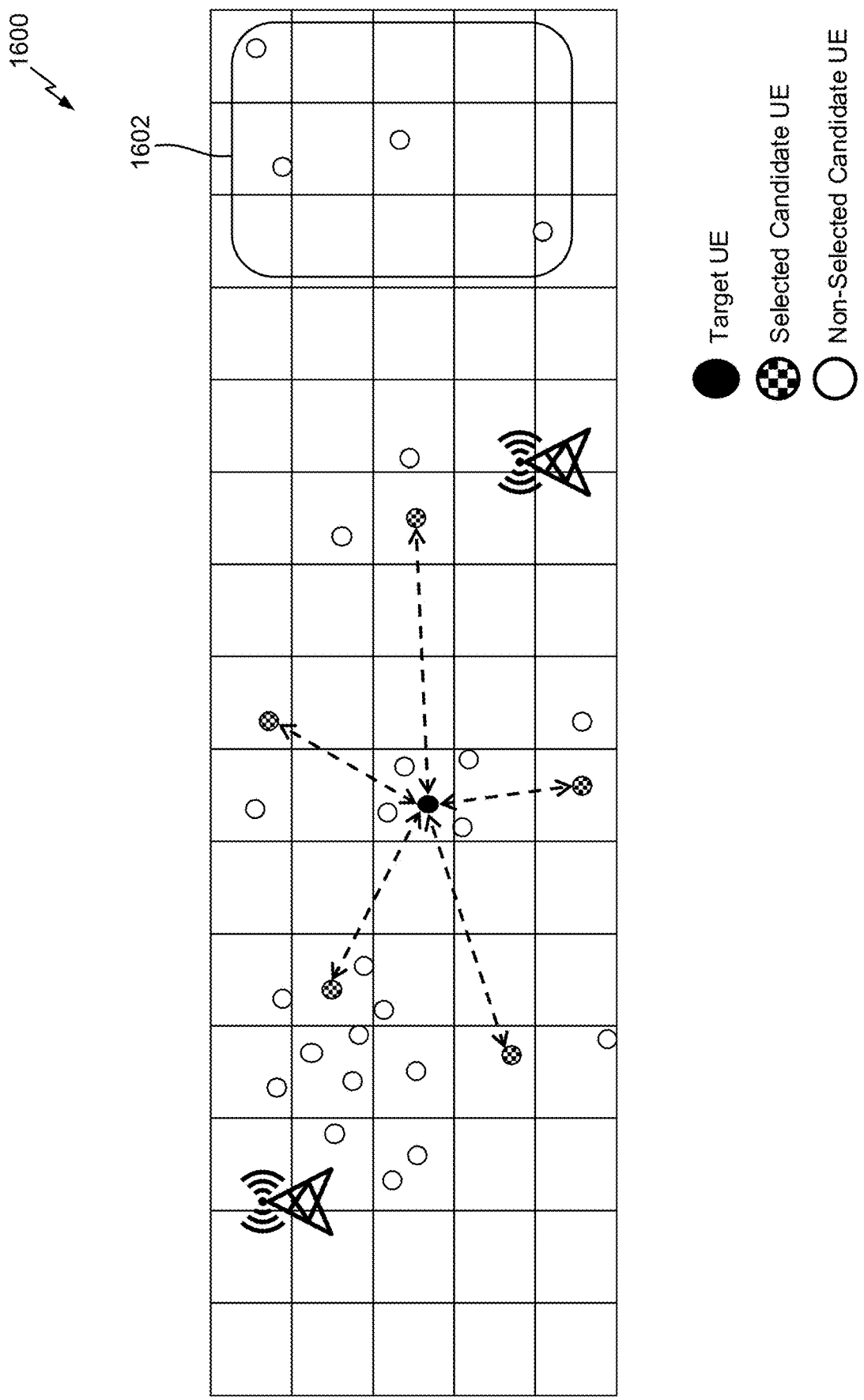

FIG. 16 illustrates an example implementation 1600 of the process 1200 of FIG. 12 in accordance with an aspect of the disclosure. FIG. 16 is similar to FIG. 13, except that an distance-based exclusion area is depicted at 1602 with a number of "far" UEs. In some designs, PRS from farther away UE requires higher power consumption from both Tx and Rx. Accordingly, UEs inside the distance-based exclusion area 1602 may only be considered in scenarios where closer candidate UEs are not available for selection.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of operating a target user equipment (UE), comprising: receiving zone information associated with a set of zones, the zone information indicating, for each of a plurality of candidate UEs for a sidelink-assisted position estimation procedure of the target UE, a zone identifier of a zone in which the respective candidate UE is located; selecting one or more candidate UEs for the sidelink-assisted position estimation procedure based at least in part upon the zone information; and performing the sidelink-assisted position estimation procedure with at least the selected one or more candidate UEs.

Clause 2. The method of clause 1, wherein the zone information for some or all of the plurality of candidate UEs is broadcasted by the respective candidate UE.

Clause 3. The method of clause 2, wherein the broadcasted zone information is transmitted via sidelink control information (SCI) of a physical sidelink control channel (PSCCH).

Clause 4. The method of any of clauses 1 to 3, wherein the zone information for some or all of the plurality of candidate UEs is received indirectly from a different respective UE or from a base station.

Clause 5. The method of any of clauses 1 to 4, wherein the zone information further includes an indication of accuracy for at least one zone identifier indication, and wherein the selecting is further based on the indication of accuracy.

Clause 6. The method of clause 5, wherein the indication of accuracy is indicated implicitly by the zone identifier, or wherein the indication of accuracy is included in sidelink control information (SCI) of a physical sidelink control channel (PSCCH) or physical sidelink shared channel (PSSCH).

Clause 7. The method of any of clauses 1 to 6, wherein a mapping of zone identifiers to zones or instructions on how to derive the mapping are pre-defined, pre-configured, or received at the target UE from an external entity.

Clause 8. The method of any of clauses 1 to 7, wherein the selecting is further based upon one or more zone-based rules.

Clause 9. The method of clause 8, wherein the one or more zone-based rules comprise: excluding, from selection, any candidate UE within a first threshold distance to the target UE, or excluding, from selection, any candidate UE in the same zone as the target UE, or excluding, from selection, any candidate UE that exceeds a second threshold distance to the target UE, or excluding, from selection, any candidate UE in any zone that exceeds a third threshold distance to respective zone of the target UE, or limiting selection of candidate UEs in the same zone to less than a first threshold number, or limiting selection of candidate UEs in an adjacent zone to the respective zone of the target UE to less than a second threshold number, or a combination thereof.

Clause 10. The method of any of clauses 1 to 9, further comprising: determining a reference signal received power (RSRP) of at least one signal from at least one of the plurality of candidate UEs, wherein the selecting is further based on the RSRP determination.

Clause 11. The method of any of clauses 1 to 10, further comprising: determining a line of sight (LOS) or non-LOS (NLOS) confidence level associated with at least one link to at least one of the plurality of candidate UEs, and wherein the selecting is further based on the LOS or NLOS confidence level determination.

Clause 12. The method of any of clauses 1 to 11, wherein the sidelink-assisted position estimation procedure comprises a timing measurement procedure, an angle measurement procedure, or a combination thereof.

Clause 13. The method of any of clauses 1 to 12, wherein each reference node associated with the sidelink-assisted position estimation procedures corresponds to the selected one or more candidate UEs.

Clause 14. The method of any of clauses 1 to 13, wherein at least one reference node associated with the sidelink-assisted position estimation procedures corresponds to a base station.

Clause 15. A target user equipment (UE), comprising: a memory; at least one transceiver; and at least one processor communicatively coupled to the memory and the at least one transceiver, the at least one processor configured to: receive, via the at least one transceiver, zone information associated with a set of zones, the zone information indicating, for each of a plurality of candidate UEs for a sidelink-assisted position estimation procedure of the target UE, a zone identifier of a zone in which the respective candidate UE is located; select one or more candidate UEs for the sidelink-assisted position estimation procedure based at least in part upon the zone information; and perform the sidelink-assisted position estimation procedure with at least the selected one or more candidate UEs.

Clause 16. The target UE of clause 15, wherein the zone information for some or all of the plurality of candidate UEs is broadcasted by the respective candidate UE.

Clause 17. The target UE of clause 16, wherein the broadcasted zone information is transmitted via sidelink control information (SCI) of a physical sidelink control channel (PSCCH).

Clause 18. The target UE of any of clauses 15 to 17, wherein the zone information for some or all of the plurality of candidate UEs is received indirectly from a different respective UE or from a base station.

Clause 19. The target UE of any of clauses 15 to 18, wherein the zone information further includes an indication of accuracy for at least one zone identifier indication, and wherein the selection is further based on the indication of accuracy.

Clause 20. The target UE of clause 19, wherein the indication of accuracy is indicated implicitly by the zone identifier, or wherein the indication of accuracy is included in sidelink control information (SCI) of a physical sidelink control channel (PSCCH) or physical sidelink shared channel (PSSCH).

Clause 21. The target UE of any of clauses 15 to 20, wherein a mapping of zone identifiers to zones or instructions on how to derive the mapping are pre-defined, pre-configured, or received at the target UE from an external entity.

Clause 22. The target UE of any of clauses 15 to 21, wherein the selecting is further based upon one or more zone-based rules.

Clause 23. The target UE of clause 22, wherein the one or more zone-based rules comprise: exclude, from selection, any candidate UE within a first threshold distance to the target UE, or exclude, from selection, any candidate UE in the same zone as the target UE, or exclude, from selection, any candidate UE that exceeds a second threshold distance to the target UE, or exclude, from selection, any candidate UE in any zone that exceeds a third threshold distance to respective zone of the target UE, or limit selection of candidate UEs in the same zone to less than a first threshold number, or limit selection of candidate UEs in an adjacent zone to the respective zone of the target UE to less than a second threshold number, or a combination thereof.

Clause 24. The target UE of any of clauses 15 to 23, wherein the at least one processor is further configured to: determine a reference signal received power (RSRP) of at least one signal from at least one of the plurality of candidate UEs, wherein the selection is further based on the RSRP determination.

Clause 25. The target UE of any of clauses 15 to 24, wherein the at least one processor is further configured to: determine a line of sight (LOS) or non-LOS (NLOS) confidence level associated with at least one link to at least one of the plurality of candidate UEs, and wherein the selection is further based on the LOS or NLOS confidence level determination.

Clause 26. The target UE of any of clauses 15 to 25, wherein the sidelink-assisted position estimation procedure comprises a timing measurement procedure, an angle measurement procedure, or a combination thereof.

Clause 27. The target UE of any of clauses 15 to 26, wherein each reference node associated with the sidelink-assisted position estimation procedures corresponds to the selected one or more candidate UEs.

Clause 28. The target UE of any of clauses 15 to 27, wherein at least one reference node associated with the sidelink-assisted position estimation procedures corresponds to a base station.

Clause 29. A target user equipment (UE), comprising: means for receiving zone information associated with a set of zones, the zone information indicating, for each of a plurality of candidate UEs for a sidelink-assisted position estimation procedure of the target UE, a zone identifier of a zone in which the respective candidate UE is located; means for selecting one or more candidate UEs for the sidelink-assisted position estimation procedure based at least in part upon the zone information; and means for performing the sidelink-assisted position estimation procedure with at least the selected one or more candidate UEs.

Clause 30. The target UE of clause 29, wherein the zone information for some or all of the plurality of candidate UEs is broadcasted by the respective candidate UE.

Clause 31. The target UE of clause 30, wherein the broadcasted zone information is transmitted via sidelink control information (SCI) of a physical sidelink control channel (PSCCH).

Clause 32. The target UE of any of clauses 29 to 31, wherein the zone information for some or all of the plurality of candidate UEs is received indirectly from a different respective UE or from a base station.

Clause 33. The target UE of any of clauses 29 to 32, wherein the zone information further includes an indication of accuracy for at least one zone identifier indication, and wherein the selection is further based on the indication of accuracy.

Clause 34. The target UE of clause 33, wherein the indication of accuracy is indicated implicitly by the zone identifier, or wherein the indication of accuracy is included in sidelink control information (SCI) of a physical sidelink control channel (PSCCH) or physical sidelink shared channel (PSSCH).

Clause 35. The target UE of any of clauses 29 to 34, wherein a mapping of zone identifiers to zones or instructions on how to derive the mapping are pre-defined, pre-configured, or received at the target UE from an external entity.

Clause 36. The target UE of any of clauses 29 to 35, wherein the selecting is further based upon one or more zone-based rules.

Clause 37. The target UE of clause 36, wherein the one or more zone-based rules comprise: excluding, from selection, any candidate UE within a first threshold distance to the target UE, or excluding, from selection, any candidate UE in the same zone as the target UE, or excluding, from selection, any candidate UE that exceeds a second threshold distance to the target UE, or excluding, from selection, any candidate UE in any zone that exceeds a third threshold distance to respective zone of the target UE, or limiting selection of candidate UEs in the same zone to less than a first threshold number, or limiting selection of candidate UEs in an adjacent zone to the respective zone of the target UE to less than a second threshold number, or a combination thereof.

Clause 38. The target UE of any of clauses 29 to 37, further comprising: means for determining a reference signal received power (RSRP) of at least one signal from at least one of the plurality of candidate UEs, wherein the selection is further based on the RSRP determination.

Clause 39. The target UE of any of clauses 29 to 38, further comprising: means for determining a line of sight (LOS) or non-LOS (NLOS) confidence level associated with at least one link to at least one of the plurality of candidate UEs, and wherein the selection is further based on the LOS or NLOS confidence level determination.

Clause 40. The target UE of any of clauses 29 to 39, wherein the sidelink-assisted position estimation procedure comprises a timing measurement procedure, an angle measurement procedure, or a combination thereof.

Clause 41. The target UE of any of clauses 29 to 40, wherein each reference node associated with the sidelink-assisted position estimation procedures corresponds to the selected one or more candidate UEs.

Clause 42. The target UE of any of clauses 29 to 41, wherein at least one reference node associated with the sidelink-assisted position estimation procedures corresponds to a base station.

Clause 43. A non-transitory computer-readable medium storing computer-executable instructions that, when executed by a target user equipment (UE), cause the target UE to: receive zone information associated with a set of zones, the zone information indicating, for each of a plurality of candidate UEs for a sidelink-assisted position estimation procedure of the target UE, a zone identifier of a zone in which the respective candidate UE is located; select one or more candidate UEs for the sidelink-assisted position estimation procedure based at least in part upon the zone information; and perform the sidelink-assisted position estimation procedure with at least the selected one or more candidate UEs.

Clause 44. The non-transitory computer-readable medium of clause 43, wherein the zone information for some or all of the plurality of candidate UEs is broadcasted by the respective candidate UE.

Clause 45. The non-transitory computer-readable medium of clause 44, wherein the broadcasted zone information is transmitted via sidelink control information (SCI) of a physical sidelink control channel (PSCCH).

Clause 46. The non-transitory computer-readable medium of any of clauses 43 to 45, wherein the zone information for some or all of the plurality of candidate UEs is received indirectly from a different respective UE or from a base station.

Clause 47. The non-transitory computer-readable medium of any of clauses 43 to 46, wherein the zone information further includes an indication of accuracy for at least one zone identifier indication, and wherein the selection is further based on the indication of accuracy.

Clause 48. The non-transitory computer-readable medium of clause 47, wherein the indication of accuracy is indicated implicitly by the zone identifier, or wherein the indication of accuracy is included in sidelink control information (SCI) of a physical sidelink control channel (PSCCH) or physical sidelink shared channel (PSSCH).

Clause 49. The non-transitory computer-readable medium of any of clauses 43 to 48, wherein a mapping of zone identifiers to zones or instructions on how to derive the mapping are pre-defined, pre-configured, or received at the target UE from an external entity.

Clause 50. The non-transitory computer-readable medium of any of clauses 43 to 49, wherein the selecting is further based upon one or more zone-based rules.

Clause 51. The non-transitory computer-readable medium of clause 50, wherein the one or more zone-based rules comprise: exclude, from selection, any candidate UE within a first threshold distance to the target UE, or exclude, from selection, any candidate UE in the same zone as the target UE, or exclude, from selection, any candidate UE that exceeds a second threshold distance to the target UE, or exclude, from selection, any candidate UE in any zone that exceeds a third threshold distance to respective zone of the target UE, or limit selection of candidate UEs in the same zone to less than a first threshold number, or limit selection of candidate UEs in an adjacent zone to the respective zone of the target UE to less than a second threshold number, or a combination thereof.

Clause 52. The non-transitory computer-readable medium of any of clauses 43 to 51, wherein the one or more instructions further cause the UE to: determine a reference signal received power (RSRP) of at least one signal from at least one of the plurality of candidate UEs, wherein the selection is further based on the RSRP determination.

Clause 53. The non-transitory computer-readable medium of any of clauses 43 to 52, wherein the one or more instructions further cause the UE to: determine a line of sight (LOS) or non-LOS (NLOS) confidence level associated with at least one link to at least one of the plurality of candidate UEs, and wherein the selection is further based on the LOS or NLOS confidence level determination.

Clause 54. The non-transitory computer-readable medium of any of clauses 43 to 53, wherein the sidelink-assisted position estimation procedure comprises a timing measurement procedure, an angle measurement procedure, or a combination thereof.

Clause 55. The non-transitory computer-readable medium of any of clauses 43 to 54, wherein each reference node associated with the sidelink-assisted position estimation procedures corresponds to the selected one or more candidate UEs.

Clause 56. The non-transitory computer-readable medium of any of clauses 43 to 55, wherein at least one reference node associated with the sidelink-assisted position estimation procedures corresponds to a base station.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of operating a target user equipment (UE), comprising:
   receiving zone information associated with a set of zones, the zone information indicating, for each of a plurality of candidate UEs for a sidelink-assisted position estimation procedure of the target UE, a zone identifier of a zone in which the respective candidate UE is located;
   selecting one or more candidate UEs for the sidelink-assisted position estimation procedure based at least in part upon the zone information; and
   performing the sidelink-assisted position estimation procedure with at least the selected one or more candidate UEs,
   wherein the selecting is further based upon one or more zone-based rules.

2. The method of claim 1, wherein the zone information for some or all of the plurality of candidate UEs is broadcasted by the respective candidate UE.

3. The method of claim 2, wherein the broadcasted zone information is transmitted via sidelink control information (SCI) of a physical sidelink control channel (PSCCH).

4. The method of claim 1, wherein the zone information for some or all of the plurality of candidate UEs is received indirectly from a different respective UE or from a base station.

5. The method of claim 1,
   wherein the zone information further includes an indication of accuracy for at least one zone identifier indication, and
   wherein the selecting is further based on the indication of accuracy.

6. The method of claim 5,
   wherein the indication of accuracy is indicated implicitly by the zone identifier, or
   wherein the indication of accuracy is included in sidelink control information (SCI) of a physical sidelink control channel (PSCCH) or physical sidelink shared channel (PSSCH).

7. The method of claim 1, wherein a mapping of zone identifiers to zones or instructions on how to derive the mapping are pre-defined, pre-configured, or received at the target UE from an external entity.

8. The method of claim 1, wherein the one or more zone-based rules comprise:
   excluding, from selection, any candidate UE within a first threshold distance to the target UE, or
   excluding, from selection, any candidate UE in the same zone as the target UE, or
   excluding, from selection, any candidate UE that exceeds a second threshold distance to the target UE, or
   excluding, from selection, any candidate UE in any zone that exceeds a third threshold distance to respective zone of the target UE, or
   limiting selection of candidate UEs in the same zone to less than a first threshold number, or
   limiting selection of candidate UEs in an adjacent zone to the respective zone of the target UE to less than a second threshold number, or
   a combination thereof.

9. The method of claim 1, further comprising:
   determining a reference signal received power (RSRP) of at least one signal from at least one of the plurality of candidate UEs,
   wherein the selecting is further based on the RSRP determination.

10. The method of claim 1, further comprising:
    determining a line of sight (LOS) or non-LOS (NLOS) confidence level associated with at least one link to at least one of the plurality of candidate UEs, and
    wherein the selecting is further based on the LOS or NLOS confidence level determination.

11. The method of claim 1, wherein the sidelink-assisted position estimation procedure comprises a timing measurement procedure, an angle measurement procedure, or a combination thereof.

12. The method of claim 1, wherein each reference node associated with the sidelink-assisted position estimation procedures corresponds to the selected one or more candidate UEs.

13. The method of claim 1, wherein at least one reference node associated with the sidelink-assisted position estimation procedures corresponds to a base station.

14. A target user equipment (UE), comprising:
    a memory;
    at least one transceiver; and
    at least one processor communicatively coupled to the memory and the at least one transceiver, the at least one processor configured to:
    receive, via the at least one transceiver, zone information associated with a set of zones, the zone information indicating, for each of a plurality of candidate UEs for a sidelink-assisted position estimation procedure of the target UE, a zone identifier of a zone in which the respective candidate UE is located;

select one or more candidate UEs for the sidelink-assisted position estimation procedure based at least in part upon the zone information; and perform the sidelink-assisted position estimation procedure with at least the selected one or more candidate UEs, wherein the selection is further based upon one or more zone-based rules.

15. The target UE of claim 14, wherein the zone information for some or all of the plurality of candidate UEs is broadcasted by the respective candidate UE.

16. The target UE of claim 15, wherein the broadcasted zone information is transmitted via sidelink control information (SCI) of a physical sidelink control channel (PSCCH).

17. The target UE of claim 14, wherein the zone information for some or all of the plurality of candidate UEs is received indirectly from a different respective UE or from a base station.

18. The target UE of claim 14,
wherein the zone information further includes an indication of accuracy for at least one zone identifier indication, and
wherein the selection is further based on the indication of accuracy.

19. The target UE of claim 18,
wherein the indication of accuracy is indicated implicitly by the zone identifier, or
wherein the indication of accuracy is included in sidelink control information (SCI) of a physical sidelink control channel (PSCCH) or physical sidelink shared channel (PSSCH).

20. The target UE of claim 14, wherein a mapping of zone identifiers to zones or instructions on how to derive the mapping are pre-defined, pre-configured, or received at the target UE from an external entity.

21. The target UE of claim 14, wherein the one or more zone-based rules comprise:
exclude, from selection, any candidate UE within a first threshold distance to the target UE, or
exclude, from selection, any candidate UE in the same zone as the target UE, or
exclude, from selection, any candidate UE that exceeds a second threshold distance to the target UE, or
exclude, from selection, any candidate UE in any zone that exceeds a third threshold distance to respective zone of the target UE, or
limit selection of candidate UEs in the same zone to less than a first threshold number, or
limit selection of candidate UEs in an adjacent zone to the respective zone of the target UE to less than a second threshold number, or
a combination thereof.

22. The target UE of claim 14, wherein the at least one processor is further configured to:
determine a reference signal received power (RSRP) of at least one signal from at least one of the plurality of candidate UEs,
wherein the selection is further based on the RSRP determination.

23. The target UE of claim 14, wherein the at least one processor is further configured to:
determine a line of sight (LOS) or non-LOS (NLOS) confidence level associated with at least one link to at least one of the plurality of candidate UEs, and
wherein the selection is further based on the LOS or NLOS confidence level determination.

24. The target UE of claim 14, wherein the sidelink-assisted position estimation procedure comprises a timing measurement procedure, an angle measurement procedure, or a combination thereof.

25. The target UE of claim 14, wherein each reference node associated with the sidelink-assisted position estimation procedures corresponds to the selected one or more candidate UEs.

26. The target UE of claim 14, wherein at least one reference node associated with the sidelink-assisted position estimation procedures corresponds to a base station.

27. A target user equipment (UE), comprising:
means for receiving zone information associated with a set of zones, the zone information indicating, for each of a plurality of candidate UEs for a sidelink-assisted position estimation procedure of the target UE, a zone identifier of a zone in which the respective candidate UE is located;
means for selecting one or more candidate UEs for the sidelink-assisted position estimation procedure based at least in part upon the zone information; and
means for performing the sidelink-assisted position estimation procedure with at least the selected one or more candidate UEs,
wherein the selection is further based upon one or more zone-based rules.

28. A non-transitory computer-readable medium storing computer-executable instructions that, when executed by a target user equipment (UE), cause the target UE to:
receive zone information associated with a set of zones, the zone information indicating, for each of a plurality of candidate UEs for a sidelink-assisted position estimation procedure of the target UE, a zone identifier of a zone in which the respective candidate UE is located;
select one or more candidate UEs for the sidelink-assisted position estimation procedure based at least in part upon the zone information; and
perform the sidelink-assisted position estimation procedure with at least the selected one or more candidate UEs,
wherein the selection is further based upon one or more zone-based rules.

* * * * *